(12) United States Patent
Hays et al.

(10) Patent No.: US 10,730,586 B2
(45) Date of Patent: Aug. 4, 2020

(54) ENERGY RECOVERY SYSTEM AND METHOD OF POWER TRANSMISSION

(71) Applicant: ORBIS WHEELS, INC., Mill Valley, CA (US)

(72) Inventors: Marcus G. Hays, San Rafael, CA (US); Scott Streeter, Santa Rosa, CA (US)

(73) Assignee: ORBIS WHEELS, INC., Mill Valley, CA (US)

(*) Notice: Subject to any disclaimer, the term of this patent is extended or adjusted under 35 U.S.C. 154(b) by 141 days.

(21) Appl. No.: 16/132,072

(22) Filed: Sep. 14, 2018

(65) Prior Publication Data
US 2019/0084650 A1   Mar. 21, 2019

Related U.S. Application Data

(60) Provisional application No. 62/558,997, filed on Sep. 15, 2017.

(51) Int. Cl.
   *B62M 11/14*     (2006.01)
   *F16F 15/315*    (2006.01)
   (Continued)

(52) U.S. Cl.
   CPC ........... *B62M 11/145* (2013.01); *B60B 19/00* (2013.01); *B62M 1/10* (2013.01); *B62M 9/02* (2013.01);
   (Continued)

(58) Field of Classification Search
   CPC ........... B62M 11/145; B62M 1/10; F03D 9/12
   See application file for complete search history.

(56) References Cited

U.S. PATENT DOCUMENTS

| 4,011,919 A | * | 3/1977 | Groeger | B60B 3/048 180/190 |
| 4,465,321 A | * | 8/1984 | Berg | B60B 3/048 301/32 |

(Continued)

FOREIGN PATENT DOCUMENTS

| CA | 2 514 903 A1 | 1/2007 |
| GB | 2 327 621 A | 2/1999 |
| WO | 90/05070 A1 | 5/1990 |

OTHER PUBLICATIONS

International Search Report dated May 23, 2019 as received in Application No. PCT/US2018/051254.
(Continued)

*Primary Examiner* — Derek D Knight
(74) *Attorney, Agent, or Firm* — Maschoff Brennan

(57) ABSTRACT

A centerless wheel assembly may include a centerless rim configured to rotate about a point. The centerless wheel assembly may also include a centerless flywheel that may be configured to indirectly couple with the centerless rim and to rotate about a point. The centerless wheel assembly may additionally include a device for rotating the centerless rim in a first direction and in a second direction. The centerless wheel assembly may also include a one-way bearing that may be disposed between the centerless rim and the centerless flywheel. The one-way bearing may be positioned such that as the centerless rim may rotate in the first direction, the centerless flywheel may be caused to rotate in the first direction and as the centerless rim may rotate in the second direction, the centerless flywheel may not be caused to rotate.

20 Claims, 11 Drawing Sheets

(51) Int. Cl.
*F16H 1/06* (2006.01)
*F16H 15/50* (2006.01)
*B62M 9/02* (2006.01)
*B60B 19/00* (2006.01)
*F01D 5/03* (2006.01)
*F03B 17/06* (2006.01)
*B62M 11/02* (2006.01)
*F03D 9/12* (2016.01)
*B62M 1/10* (2010.01)
*B63H 16/20* (2006.01)
*F16F 15/30* (2006.01)
*F03D 1/04* (2006.01)

(52) U.S. Cl.
CPC .............. *B62M 11/02* (2013.01); *F01D 5/03* (2013.01); *F03B 17/061* (2013.01); *F03D 9/12* (2016.05); *F16F 15/3156* (2013.01); *F16H 1/06* (2013.01); *F16H 15/50* (2013.01); *B63H 16/20* (2013.01); *B63H 2016/202* (2013.01); *F03D 1/04* (2013.01); *F05B 2210/16* (2013.01); *F05B 2240/33* (2013.01); *F05B 2260/4031* (2013.01); *F05D 2240/24* (2013.01); *F16F 15/30* (2013.01)

(56) References Cited

U.S. PATENT DOCUMENTS

| | | | | |
|---|---|---|---|---|
| 5,071,196 | A * | 12/1991 | Sbarro | ............... B60B 3/048 301/1 |
| 5,261,684 | A * | 11/1993 | Soto | ............... A61G 5/00 280/250.1 |
| 9,764,592 | B1 * | 9/2017 | Hays | ............... B60B 19/00 |
| 9,861,540 | B2 * | 1/2018 | Hays | ............... B60K 17/043 |
| 10,492,964 | B2 * | 12/2019 | Hays | ............... B60K 7/0007 |
| 2005/0285461 | A1 | 12/2005 | Kitamura et al. | |
| 2007/0052240 | A1 | 3/2007 | Hutchinson et al. | |
| 2010/0109280 | A1 | 5/2010 | Wills | |
| 2012/1020792 | | 5/2012 | Nishimura | |
| 2018/0257427 | A1 * | 9/2018 | Hays | ............... B60B 3/048 |

OTHER PUBLICATIONS

Written Opinion of the International Searching Authority dated May 23, 2019 as received in Application No. PCT/US2018/051254.

* cited by examiner

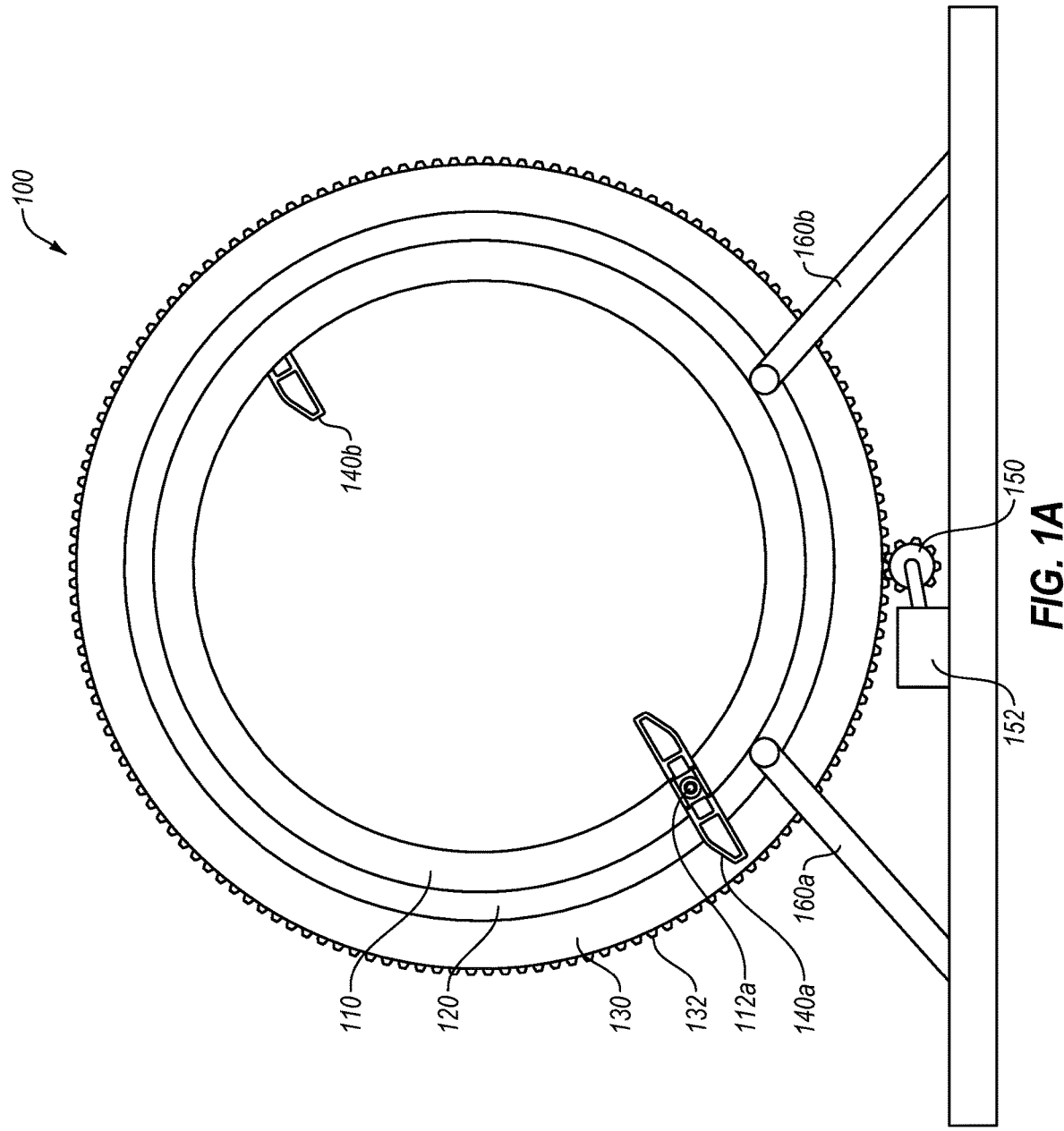

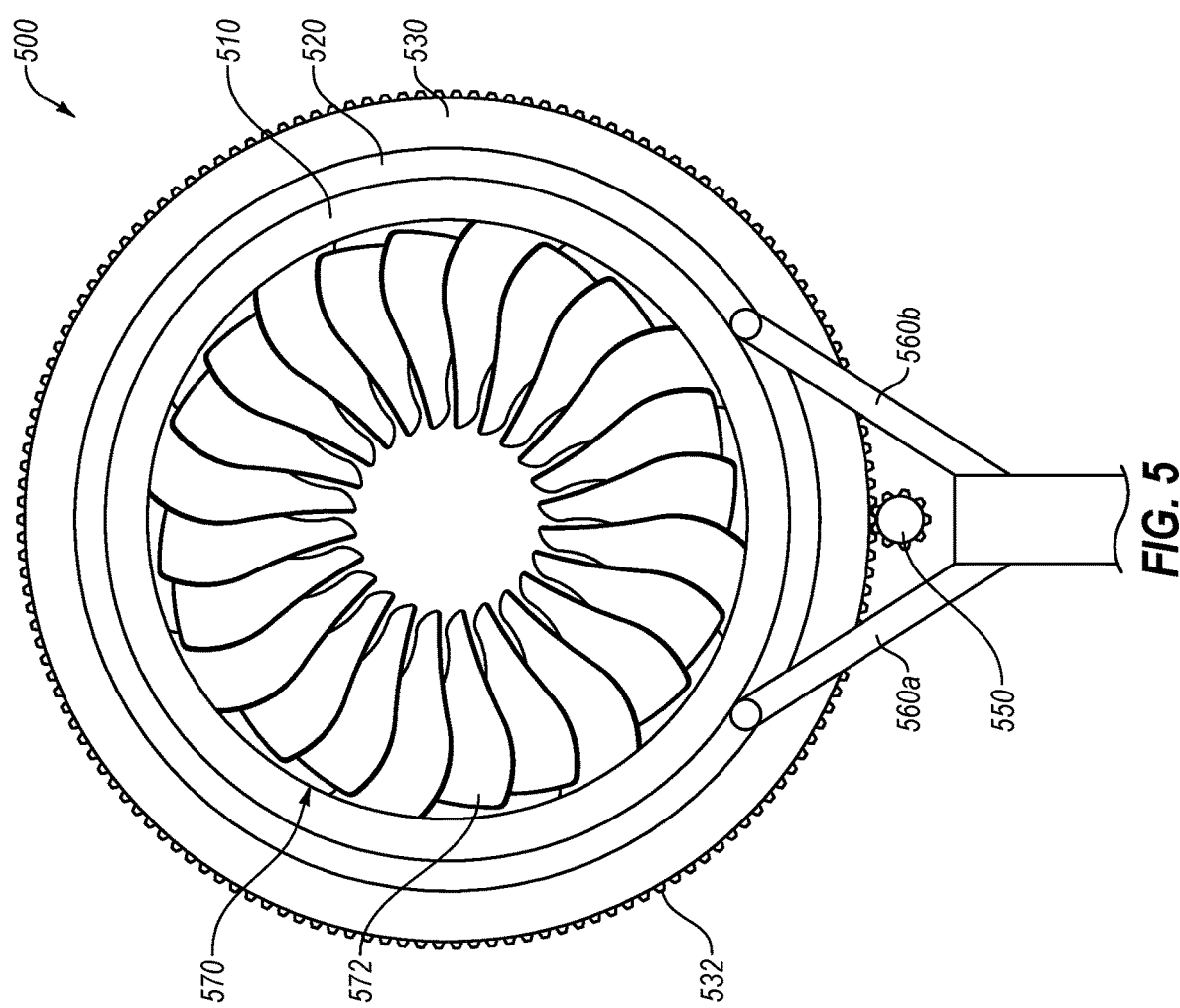

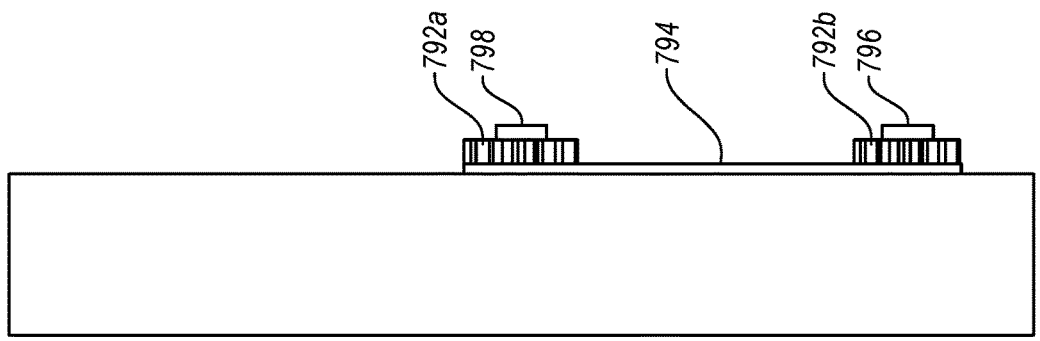
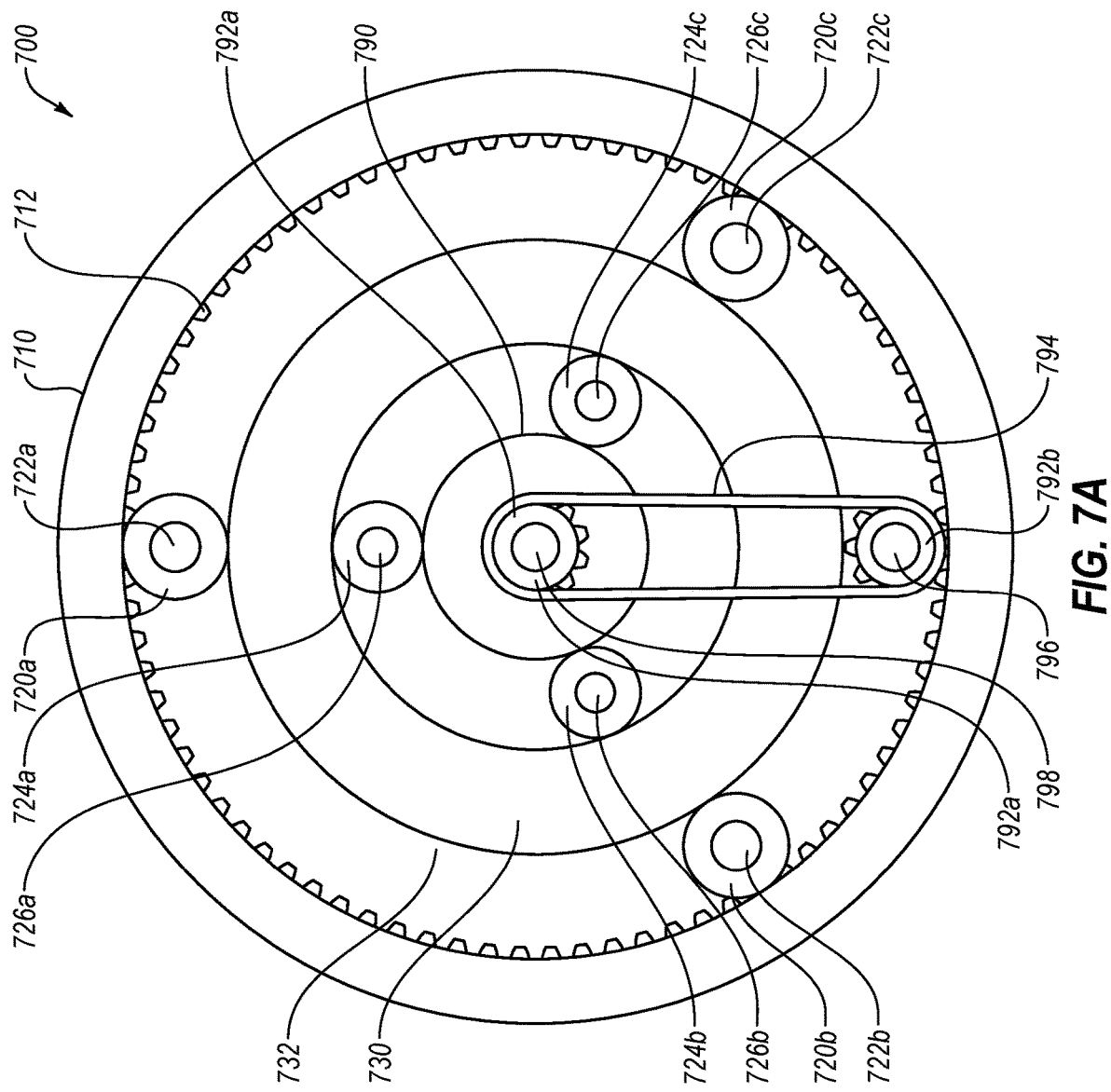

ENERGY RECOVERY SYSTEM AND METHOD OF POWER TRANSMISSION

CROSS-REFERENCE TO RELATED APPLICATION

This application claims the benefits of U.S. Provisional Application No. 62/558,997, filed on Sep. 15, 2017, which is incorporated herein by reference in its entirety.

FIELD

The embodiments discussed in the present disclosure relate to an energy recovery system and a method of power transmission.

BACKGROUND

Some wheels have spokes made of tensioned, adjustable metal wires, or some other connecting body between the edge and the middle of the wheel. The spokes may connect a rim of a particular wheel to a hub of the particular wheel and may help support an applied load. Wheels with tensioned spokes may be used in bicycles, wheelchairs, motorcycles, automobiles, and other vehicles.

Some flywheels are made of steel and rotate on bearings. The flywheels may provide continuous power output in systems where the energy source is not continuous. The flywheels may be used in vehicles for the purpose of energy storage and braking systems.

The subject matter claimed in the present disclosure is not limited to embodiments that solve any disadvantages or that operate only in environments such as those described above. Rather, this statement is only provided to illustrate one example technology area where some embodiments described may be practiced.

SUMMARY

One or more embodiments of the present disclosure may relate to a centerless wheel assembly that may include a centerless rim configured to rotate about a point. The centerless wheel assembly may also include a centerless flywheel configured to indirectly couple with the centerless rim and to rotate about a point. The centerless wheel assembly may additionally include a device for rotating the centerless rim in a first direction and in a second direction. The centerless wheel assembly may also include a one-way bearing that may be disposed between the centerless rim and the centerless flywheel. The one-way bearing may be positioned such that as the centerless rim may rotate in the first direction, the centerless flywheel may be caused to rotate in the first direction and as the centerless rim may rotate in the second direction, the centerless flywheel may not be caused to rotate.

The centerless wheel assembly may additionally include a drive gear shaped to interface with the centerless flywheel and may be configured to rotate as the centerless flywheel may rotate. The centerless flywheel may be configured to drive the drive gear.

The centerless wheel assembly may also include a shaft with a first end and a second end that may be coupled to the drive gear on the first end and coupled to the generator on the second end.

The centerless wheel assembly may additionally include a clutch coupled to the drive gear such that when the clutch may be engaged, the shaft may be caused to rotate.

The centerless wheel assembly may also include a pair of pedals coupled to the centerless rim. The pair of pedals may also cause the centerless rim to rotate.

The centerless wheel assembly may additionally include a drive chain that may be coupled to the centerless flywheel such that as the centerless flywheel may rotate, the drive chain may be caused to rotate.

The centerless wheel assembly may also include a turbine that may be disposed within the centerless rim and may be fixedly coupled to the centerless rim such that as the turbine may be caused to rotate, the centerless rim may be caused to rotate.

The one-way bearing of the centerless wheel assembly may also permit the centerless flywheel to continue to rotate in the first direction when the centerless rim may be rotating in the second direction or may not be caused to rotate.

The centerless wheel assembly may additionally include a continuously variable transmission that may be configured to indirectly couple with the centerless flywheel. The centerless wheel assembly may also include a first plurality of roller guides that may be disposed between the centerless flywheel and the continuously variable transmission. The first plurality of roller guides may positioned such that as the centerless flywheel may rotate, the continuously variable transmission may also be caused to rotate.

The centerless wheel assembly may also include an input driver shaft. The input driver shaft may be disposed between the centerless rim and a first roller. The first roller may be configured to rotate about a second point. The centerless wheel assembly may additionally include an output driver shaft. The output driver shaft may be disposed between the continuously variable transmission and a second roller. The second roller may be configured to rotate about the point. The centerless wheel assembly may also include a continuously variable transmission belt. The continuously variable transmission belt may couple the first roller and the second roller such that as the first roller may rotate in the first direction, the second roller may be caused to rotate in the first direction.

One or more embodiments of the present disclosure may relate to a centerless wheel assembly that includes a centerless rim configured to rotate about a point. The centerless wheel assembly may also include a centerless flywheel configured to indirectly couple with the centerless rim and to rotate about a point. The centerless wheel assembly may additionally include a device for rotating the centerless rim in a first direction and in a second direction. The centerless wheel assembly may also include a first plurality of roller guides that may be disposed between the centerless rim and the centerless flywheel. The first plurality of roller guides may be positioned such that as the centerless rim may rotate in the first direction, the centerless flywheel may be caused to rotate in the first direction and as the centerless rim may rotate in the second direction, the centerless flywheel may not be caused to rotate.

The centerless wheel assembly may additionally include a drive gear shaped to interface with the centerless flywheel and may be configured to rotate as the centerless flywheel may rotate. The centerless flywheel may be configured to drive the drive gear.

The centerless wheel assembly may also include a shaft with a first end and a second end that may be coupled to the drive gear on the first end and coupled to the generator on the second end.

The centerless wheel assembly may additionally include a clutch coupled to the drive gear such that when the clutch may be engaged, the shaft may be caused to rotate.

The centerless wheel assembly may additionally include a drive chain that may be coupled to the centerless flywheel such that as the centerless flywheel may rotate, the drive chain may be caused to rotate.

The centerless wheel assembly may also include a turbine that may be disposed within the centerless rim and may be fixedly coupled to the centerless rim such that as the turbine may be caused to rotate, the centerless rim may be caused to rotate.

The first plurality of bearings of the centerless wheel assembly may also enable the centerless flywheel to continue to rotate in the first direction when the centerless rim may be rotating in the second direction or may not be caused to rotate.

The centerless wheel assembly may additionally include a continuously variable transmission that may be configured to indirectly couple with the centerless flywheel. The centerless wheel assembly may also include a second plurality of roller guides that may be disposed between the centerless flywheel and the continuously variable transmission. The second plurality of roller guides may positioned such that as the centerless flywheel may rotate, the continuously variable transmission is also caused to rotate.

The centerless wheel assembly may also include an input driver shaft. The input driver shaft may be disposed between the centerless rim and a first roller. The first roller may be configured to rotate about a point. The centerless wheel assembly may additionally include an output driver shaft. The output driver shaft may be disposed between the continuously variable transmission and a second roller. The second roller may be configured to rotate about a point. The centerless wheel assembly may also include a continuously variable transmission belt. The continuously variable transmission belt may couple the first roller and the second roller such that as the first roller may rotate in the first direction, the second roller may be caused to rotate in the first direction.

One or more embodiments of the present disclosure may relate to vehicle that may include a centerless wheel assembly. The centerless wheel assembly may include a centerless rim configured to rotate about a point. The centerless wheel assembly may also include a centerless flywheel configured to indirectly couple with the centerless rim and to rotate about the point. The centerless wheel assembly may additionally include a device for rotating the centerless rim in a first direction and in a second direction. The centerless wheel assembly may also include a first plurality of roller guides that may be disposed between the centerless rim and the centerless flywheel. The first plurality of roller guides may be positioned such that as the centerless rim may rotate in the first direction, the centerless flywheel may be caused to rotate in the second direction and as the centerless rim may rotate in the second direction, the centerless flywheel may not be caused to rotate. The centerless wheel assembly may additionally include a motive force device that may be configured to propel the vehicle. The centerless flywheel may also be configured to impart rotational energy to the motive force device to propel the vehicle.

BRIEF DESCRIPTION OF THE DRAWINGS

Example embodiments will be described and explained with additional specificity and detail through the use of the accompanying drawings in which:

FIGS. 1A and 1B illustrate various views of an example centerless flywheel assembly with a device for rotating an example centerless rim;

FIG. 5 illustrates an example centerless flywheel assembly with an example centerless turbine;

FIGS. 7A and 7B illustrate various views of an example centerless flywheel assembly with an example continuously variable transmission.

DESCRIPTION OF EMBODIMENTS

Embodiments of the present disclosure are explained with reference to the accompanying drawings.

Figure 1B:
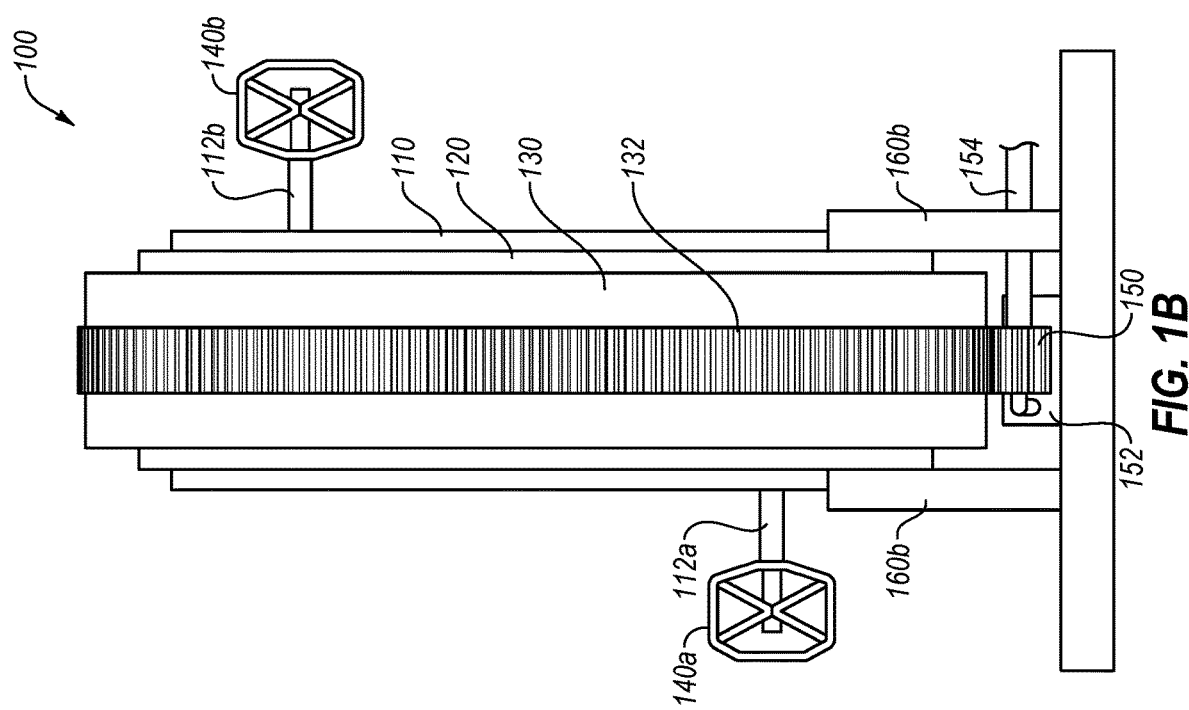

FIGS. 1A and 1B illustrate various views of an example centerless flywheel assembly 100, in accordance with one or more embodiments of the present disclosure. The centerless flywheel assembly 100 may include a centerless rim 110, a set of one-way bearings 120, a centerless flywheel 130, a pair of pedals 140a and 140b, a drive gear 150, a clutch 152, a drive shaft 154, and a pair of support arms 160a and 160b. The centerless flywheel assembly 100 may be used to generate and/or store momentum or rotational energy in a centerless flywheel 130 and to use the stored momentum or rotational energy to supplement and/or replace an energy source. In some embodiments, the centerless flywheel assembly 100 may be used to store momentum or rotational energy in a centerless flywheel 130 and to use the stored momentum or rotational energy to power the centerless flywheel assembly 100. In some embodiments, the centerless flywheel assembly 100 may function to supplement or replace an energy source (e.g., a generator or a battery) in the absence of or in the case of insufficient user input through the pair of pedals 140a and 140b. In some embodiments, the centerless flywheel assembly 100 may be used to provide a more continuous energy source in the absence of constant user input through the pair of pedals 140a and 140b.

The centerless rim 110 may include a device or component via which a rotational force is applied to the centerless flywheel assembly 100. As illustrated in FIG. 1A, the centerless rim 110 may include a circular shape with a void in material in the center of the circular shape. The centerless rim 110 may be shaped to interface with the set of one-way bearings 120 such that as the centerless rim 110 rotates in a first direction, the centerless rim 110 may rotate freely in a second direction, while the set of one-way bearings 120 is locked into place. In operation, the centerless rim 110 may be caused to rotate, and the set of one-way bearings 120 may be oriented such that as the centerless rim 110 rotates, the centerless flywheel 130 is also caused to rotate to store energy. In some embodiments, the centerless rim 110 may be indirectly coupled with the centerless flywheel 130 such that as the centerless rim 110 rotates in a first direction, the centerless flywheel 130 is caused to rotate in the first direction, and as the centerless rim 110 rotates in the second direction, the centerless flywheel 130 is not caused to rotate.

The centerless rim 110 may include any shape or profile. The centerless rim 110 may include a profile such that the set of one-way bearings 120 may roll along the centerless rim 110. The diameter of centerless rim 110 may be any size or shape. For example, the centerless rim 110 may fall within the range of 6 inches to 4 feet. For example, the centerless rim 110 may be sized of a circumference and/or width comparable or similar to any standardized size of wheel used on automobiles, motorcycles, scooters, bicycles, earth-moving equipment, wheelchairs and mobility devices, lawn and garden machines, planetary rovers, and/or any other vehicle. In some embodiments, the centerless rim 110 may enclose a generally cylindrical shape with two flat faces and one curved face. The centerless rim 110 may be configured to rotate about a line that passes approximately perpendicularly through the center of the two flat faces of the cylindrical shape enclosed by the centerless rim 110. In some embodiments, the void within the centerless rim 110 may be used for the storage of a battery, generator, and/or other device or component.

The set of one-way bearings 120 may include a device or component that facilitates rotation of the centerless flywheel 130 relative to the centerless rim 110. For example, the set of one-way bearings 120 may be disposed between the centerless rim 110 and the centerless flywheel 130 such that the centerless rim 110 rotates with the centerless flywheel 130 in one direction, and can rotate independently of the centerless flywheel 130 in another direction. The set of one-way bearings 120 may include a profile such that the centerless flywheel 130 and/or the centerless rim 110 may roll along the set of one-way bearings 120. Additionally or alternatively, the set of one-way bearings 120 may facilitate driving the centerless flywheel 130 in a first direction of rotation while allowing the centerless rim 110 to rotate in the first direction, rotate in a second direction, and/or remain stationary. In some embodiments, in addition or alternatively to a set of one-way bearings 120, any other ratchet-like mechanism may be used to translate rotational motion of the centerless rim 110 to the centerless flywheel 130.

The centerless flywheel 130 may include a device or component that may be used to store rotational energy transferred from the centerless rim 110 through the set of one-way bearings 120. For example, the set of one-way bearings 120 may cause the centerless flywheel 130 to rotate at the same speed as the centerless rim 110. Additionally or alternatively, as the centerless rim 110 is caused to rotate more quickly, the set of one-way bearings 120 may cause the centerless flywheel 130 to match the speed of the centerless rim 110. In some embodiments, the centerless rim 110 may allow the centerless flywheel 130 to rotate independently of the centerless rim 110 such that as the centerless rim 110 slows down, the centerless flywheel 130 may continue to rotate. In some embodiments, the centerless flywheel 130 may spin more quickly than the centerless rim 110.

In some embodiments, the centerless flywheel 130 may store rotational energy generated by the movement of the centerless rim 110 via the pedals 140a and 140b and transferred through the set of one-way bearings 120 into the centerless flywheel 130. In some embodiments, the centerless flywheel 130 may rotate more quickly than the centerless rim 110, may rotate in an opposite direction of the centerless rim 110, and/or may continue to rotate even when the centerless rim 110 is no longer rotating.

The centerless flywheel 130 may include any shape or profile. The centerless flywheel 130 may have a comparable size and orientation as the centerless rim 110. In some embodiments, the centerless flywheel 130 may enclose a generally cylindrical shape with two flat faces and one curved face. The centerless flywheel 130 may be configured to rotate about a line that passes approximately perpendicularly through the center of the two flat faces of the cylindrical shape enclosed by the centerless flywheel 130. The line about which the centerless flywheel 130 rotates may be the same or similar to the line about which the centerless rim 110 rotates. For example, the centerless flywheel 130 may be generally co-planar and co-axially aligned with the centerless rim 110 about the line about which the centerless flywheel 130 and the centerless rim 110 rotate.

The drive gear 150 may include a device or component configured to interface with the centerless flywheel 130 and the drive shaft 154 such that as the centerless flywheel 130 rotates, the drive gear 150 is also caused to rotate and impart a corresponding rotation to the drive shaft 154. In some embodiments, the centerless flywheel 130 may be coupled with the drive gear 150 and may provide continuous power output to the drive gear 150 for a time, even when the pedals 140a and 140b are no longer being driven and/or the centerless rim 110 is no longer rotating. In some embodiments, the drive gear 150 may be coupled to a drive shaft 154. In these and other embodiments, the rotation of the drive gear 150 may be passed to the drive shaft 154, for example, by keying the drive gear 150 and the drive shaft 154, or any other known mechanism for causing two bodies (the drive gear 150 and the drive shaft 154) to rotate as a combined body.

In some embodiments, the drive gear 150 may be positioned along a plane that is generally parallel with the two flat faces of the cylindrical shape enclosed by the centerless flywheel 130. In some embodiments, the drive gear 150 may include teeth facing a direction generally perpendicular to a plane that is generally parallel with the two flat faces of the cylindrical shape enclosed by the centerless flywheel 130. In some embodiments, the drive gear 150 may include teeth facing a direction pointing generally along the plane. In accordance with one or more centerless wheel assemblies of the present disclosure, the drive gear 150 may include a helical gear.

In some embodiments, the centerless flywheel 130 may include gear teeth 132 located on the outer surface of the centerless flywheel 130 for interfacing with the drive gear 150. In some embodiments, the centerless flywheel 130 may include a rail (not shown) that may run along the perimeter of a flat face of the cylindrical shape enclosed by the centerless flywheel 130. The rail may be positioned along a plane that is generally perpendicular with the flat faces of the cylindrical shape enclosed by the centerless flywheel 130 and may project outward away from the flat face of the cylindrical shape enclosed by the centerless flywheel 130 in a direction generally parallel with the line about which the centerless flywheel 130 rotates. The rail may include teeth (not shown) for interfacing with the drive gear 150.

In some embodiments, the centerless flywheel assembly 100 may include bearings, including one-way bearings, between the drive shaft 154 and the drive gear 150. The bearings may facilitate rotation of the drive gear 150 relative to the drive shaft 154. Additionally or alternatively, the bearings may facilitate driving the drive gear 150 in a first direction of rotation of the drive shaft 154 while allowing the drive gear 150 to rotate freely about the drive shaft 154 in a second direction.

In some embodiments, the drive shaft 154 may be coupled with and may provide power to a pump, generator, propeller, turbine, and/or similar element. For example, as the drive shaft 154 rotates, the rotation may generate electrical energy that may be immediately output to a secondary device or may be stored in a battery for later use. As another example, the drive shaft 154 may be coupled to the drive mechanism of a pump such that as the drive shaft 154 rotates, the pump displaces a fluid.

The support arms 160a and 160b may include any component or device configured to support one or more components of the centerless flywheel assembly 100 that may remain fixed relative to the rotation of the centerless rim 110 and centerless flywheel 130. In some embodiments, the support arms 160a and 160b may be coupled to the set of one-way bearings 120 or an associated component thereof, such as a covering or casing for the set of one-way bearings 120. In some embodiments, the centerless flywheel assembly 100 may be supported by one of the support arms 160a and 160b.

In some embodiments, the centerless rim 110 may include pedal rods 112a and 112b. The pedal rods 112a and 112b may be cantilevered from the centerless rim 110. The cross-section of pedal rods 112a and 112b may have any shape. The pedal rods 112a and 112b may be positioned along a plane that is generally perpendicular with the flat faces of the cylindrical shape enclosed by the centerless rim 110 and may project outward away from the flat faces of the cylindrical shape enclosed by the centerless rim 110 in a direction generally parallel with the line about which the centerless rim 110 rotates. In some embodiments, the pedal rod 112a may be fixedly coupled to a first flat face of the cylindrical shape enclosed by the centerless rim 110 and/or the pedal rod 112b may be fixedly coupled to a second flat face of the cylindrical shape enclosed by the centerless rim 110, opposite the first flat face.

In some embodiments, the pedal rods 112a and 112b may be coupled to the pair of pedals 140a and 140b, respectively. The pair of pedals 140a and 140b may have any shape and may be configured to rotate about the pedal rods 112a and 112b, respectively. For example, the pedal 140a may rotate about the pedal rod 112a and the pedal 140b may rotate about the pedal rod 112b. The pair of pedals 140a and 140b may provide a mechanism for rotating the centerless rim 110 in a first direction and in a second direction. Any other mechanism or modality of imparting rotational force to the centerless rim 110 may be used.

In some embodiments, the centerless flywheel assembly 100 may include bearings, including one-way bearings, between the pedal rods 112a and 112b and the pair of pedals 140a and 140b. The bearings may facilitate rotation of the pair of pedals 140a and 140b relative to the pedal rods 112a and 112b.

A clutch 152 may be coupled to the drive gear 150. In some embodiments, the clutch 152 may be coupled to the drive gear 150 such that when the clutch 152 is engaged, the drive gear 150 is coupled to the drive shaft 154 such that rotation of the drive gear 150 causes rotation of the drive shaft 154. In some embodiments, when the clutch 152 is not engaged, the drive gear 150 may be decoupled from the drive shaft 154 such that rotation of the drive gear 150 may not cause rotation of the drive shaft 154. Additionally or alternatively, the clutch 152 may couple and/or decouple the drive gear 150 from the centerless flywheel 130. In some embodiments, the clutch 152 may couple the drive gear 150 with the centerless flywheel 130 until the centerless flywheel 130 is rotating below a predetermined speed or revolutions per minute (RPM). In some embodiments, the clutch 152 may decouple the drive gear 150 from the centerless flywheel 130 to allow the centerless flywheel 130 to rotate above the predetermined speed or RPM or to achieve a maximum speed or RPM.

In some embodiments, the use of the centerless flywheel 130 provides an increase in efficiency compared to traditional flywheels, or other flywheels that are not operating with a centerless wheel. For example, because the centerless flywheel 130 does not include a central portion of mass, or even spokes, the entirety of the mass of the centerless flywheel 130 is located along the periphery of the centerless flywheel 130. Such an arrangement increases the angular momentum of the centerless flywheel 130 compared to another flywheel of the same mass due to the concentration of the mass at the distance away from the point of rotation.

Modifications, additions, or omissions may be made to FIGS. 1A and/or 1B without departing from the scope of the present disclosure. For example, the centerless flywheel assembly 100 may include more or fewer elements than those illustrated and described in the present disclosure. For example, the centerless flywheel assembly 100 may include any of the components or arrangements consistent with the present disclosure.

Figure 2A:
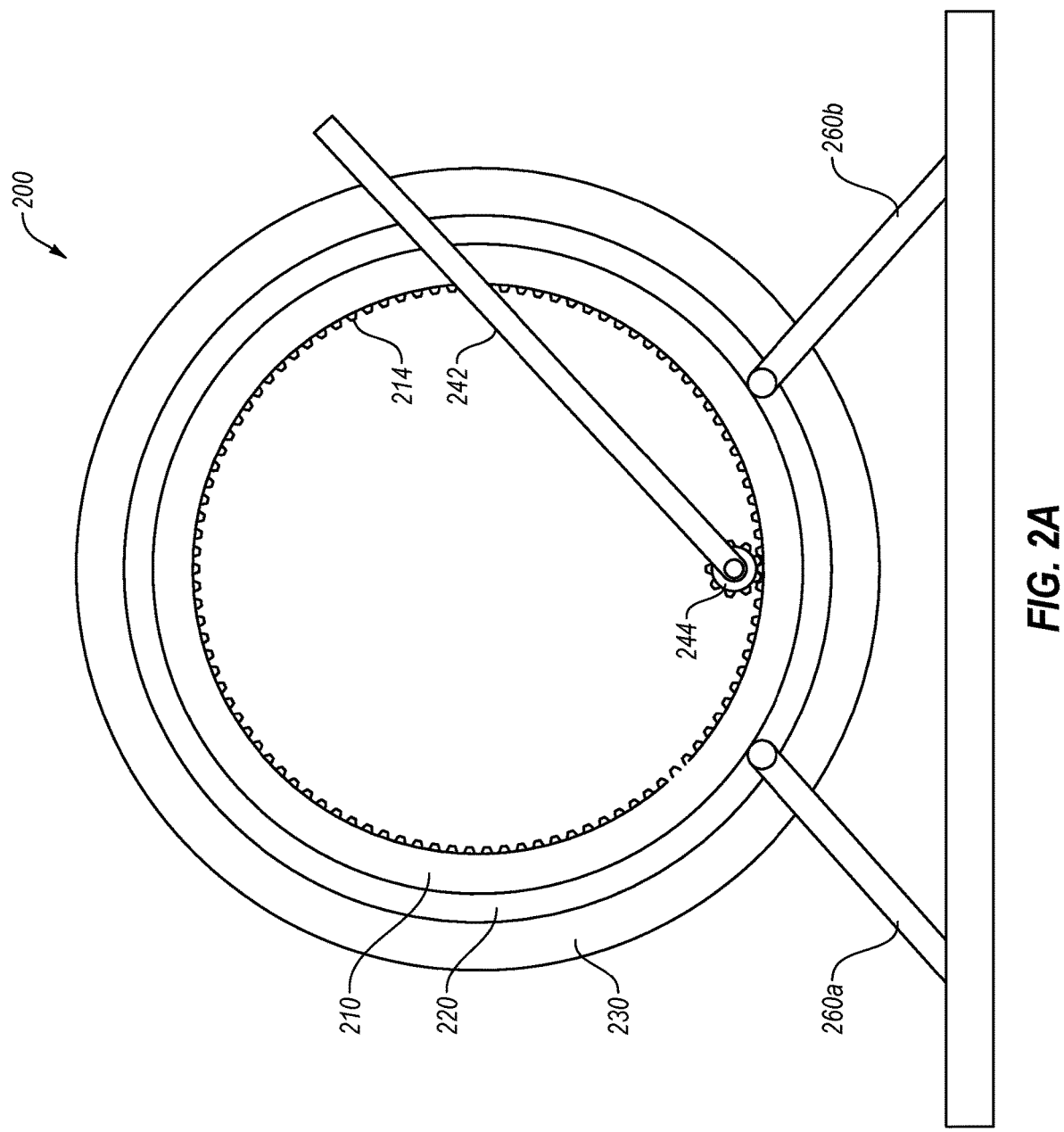
FIGS. 2A and 2B illustrate various views of another example centerless flywheel assembly with a device for rotating an example centerless rim.
Figure 2B:
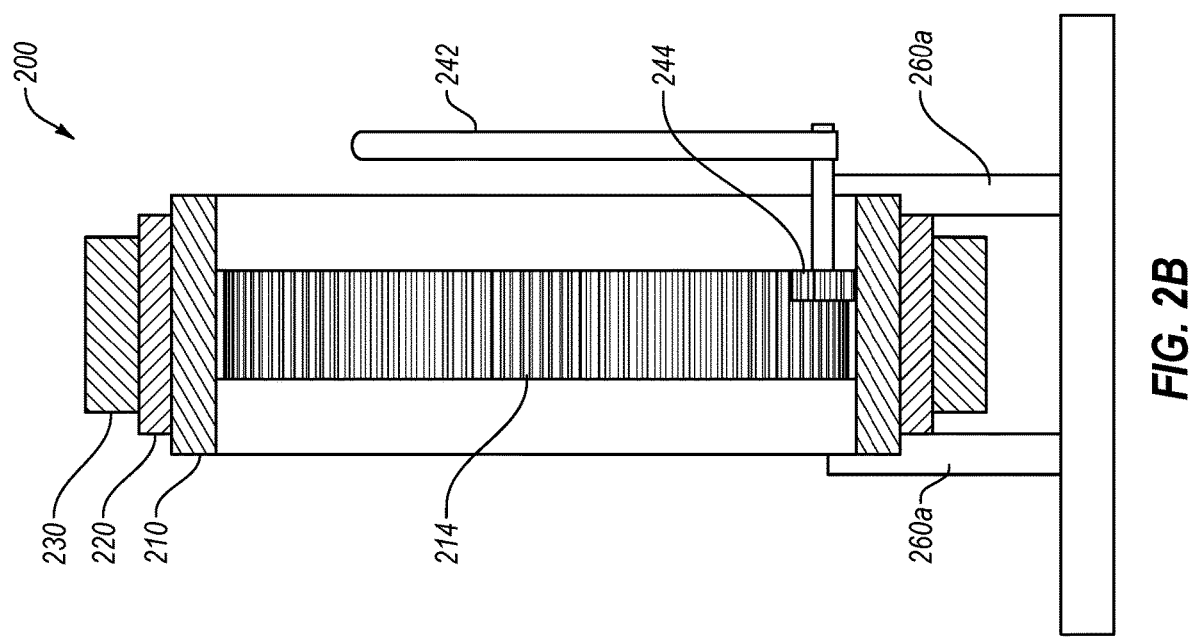

FIGS. 2A and 2B illustrate various views of another example centerless flywheel assembly 200, in accordance with one or more embodiments of the present disclosure. For example, FIG. 2 may illustrate a centerless rim 210, a set of one-way bearings 220, a centerless flywheel 230, a ratcheting lever 242, a ratcheting gear 244, and/or and support arms 260a and 260b. The centerless flywheel assembly 200 may be used to generate and/or store momentum or rotational energy in a centerless flywheel 230 and to use the stored momentum or rotational energy to supplement or replace an energy source. In some embodiments, the centerless flywheel assembly 200 may be used to store momentum or rotational energy in a centerless flywheel 230 and to use the stored momentum or rotational energy to power centerless flywheel assembly 200. In some embodiments, the centerless flywheel assembly 200 may be used to provide a more continuous energy source in the absence of constant user input through the pair of pedals 240a and 240b.

One or more of the components of the centerless flywheel assembly 200 may be similar or comparable to the commonly named components of FIGS. 1A and/or 1B. For example, the centerless rim 210, set of one-way bearings 220, and centerless flywheel 230 of FIGS. 2A and 2B may be similar or comparable to the centerless rim 110, set of one-way bearings 120, and centerless flywheel 130 of FIGS. 1A and/or 1B, respectively. As illustrated in FIGS. 2A and 2B, the centerless flywheel assembly 200 may include one or more different structures than the centerless flywheel assembly 100 of FIGS. 1A and/or 1B. For example, the centerless rim 210 of FIGS. 2A and 2B may be coupled with the ratcheting lever 242. In addition, the centerless flywheel 230 may be constructed of one or more centerless flywheel portions.

The centerless rim 210 may include a device or component via which a rotational force is applied to the centerless flywheel assembly 200. In some embodiments, the centerless rim 210 may include teeth 214 along the inner surface of the centerless rim 210. The teeth 214 are configured to interface with the ratcheting gear 244. In some embodiments, the centerless rim 210 may be indirectly coupled with the centerless flywheel 230 such that as the centerless rim 210 rotates in a first direction, the centerless flywheel 230 is caused to rotate in the first direction, and as the centerless rim 210 rotates in the second direction, the centerless flywheel 230 is not caused to rotate.

The centerless rim 210 may include any shape or profile. The centerless rim 210 may include a profile such that the set of one-way bearings 220 may roll along the centerless rim 210. The diameter of centerless rim 210 may be any size or shape. For example, the centerless rim 210 may fall within the range of 6 inches to 4 feet.

The ratcheting lever 242 may include a device or component configured to interface with the centerless rim 210 and ratcheting gear 244 such that as ratcheting lever 242 is pulled or pushed, the ratcheting gear 244 is caused to rotate and impart a corresponding rotation to the centerless rim 210. In some embodiments, the ratcheting lever 242 may be supported by support arm 260a and/or support arm 260b. Additionally or alternatively, the ratcheting lever 242 may be supported by the set of one-way bearings 220.

The cross-section of the ratcheting lever 242 may have any shape. The ratcheting lever 242 may be positioned along a plane that is generally perpendicular with the flat faces of the cylindrical shape enclosed by the centerless rim 210. The ratcheting lever 242 may be coupled with the centerless rim 210 via the ratcheting gear 244 such that as the ratcheting lever 242 is pushed or pulled in a first direction approximately parallel to the rotation of the centerless rim 210, the centerless rim 210 is caused to rotate. Additionally or alternatively, the ratcheting lever 242 may be coupled with the centerless rim 210 via the ratcheting gear 244 such that as the ratcheting lever 242 is pushed or pulled in a second direction approximately parallel to the rotation of the centerless rim 210 and opposite in direction from the first direction, the centerless rim 210 is not caused to rotate. In some embodiments, a second set of one-way bearings (not shown) may facilitate the rotation of the centerless rim 210 when the ratcheting lever 242 is pushed or pulled in the first direction. Additionally or alternatively, the second set of one-way bearings may not cause the rotation of the centerless rim 210 when the ratcheting lever 242 is pushed or pulled in the second direction.

The ratcheting gear 244 may include a device or component configured to interface with the centerless rim 210 and the ratcheting lever 242 such that as the ratcheting gear 244 rotates, the centerless rim 210 is also caused to rotate. In some embodiments, the ratcheting gear 244 may be fixed to the centerless flywheel assembly 200 in such a way that the ratcheting gear 244 may rotate.

In some embodiments, the ratcheting gear 244 may be positioned along a plane that is generally parallel with the two flat faces of the cylindrical shape enclosed by the centerless rim 210. In some embodiments, the ratcheting gear 244 may include teeth facing a direction generally perpendicular to a plane that is generally parallel with the two flat faces of the cylindrical shape enclosed by the centerless flywheel 130. In some embodiments, the ratcheting gear 244 may include teeth facing a direction pointing generally along the plane. In accordance with one or more centerless wheel assemblies of the present disclosure, the ratcheting gear 244 may include a helical gear.

Figure 2D:
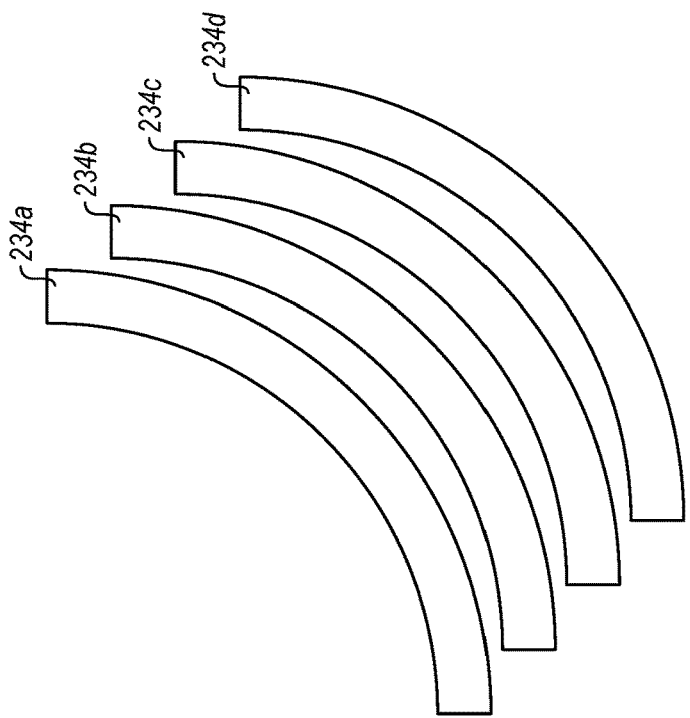
FIG. 2D illustrates an example of several centerless flywheel portions.
Figure 2C:
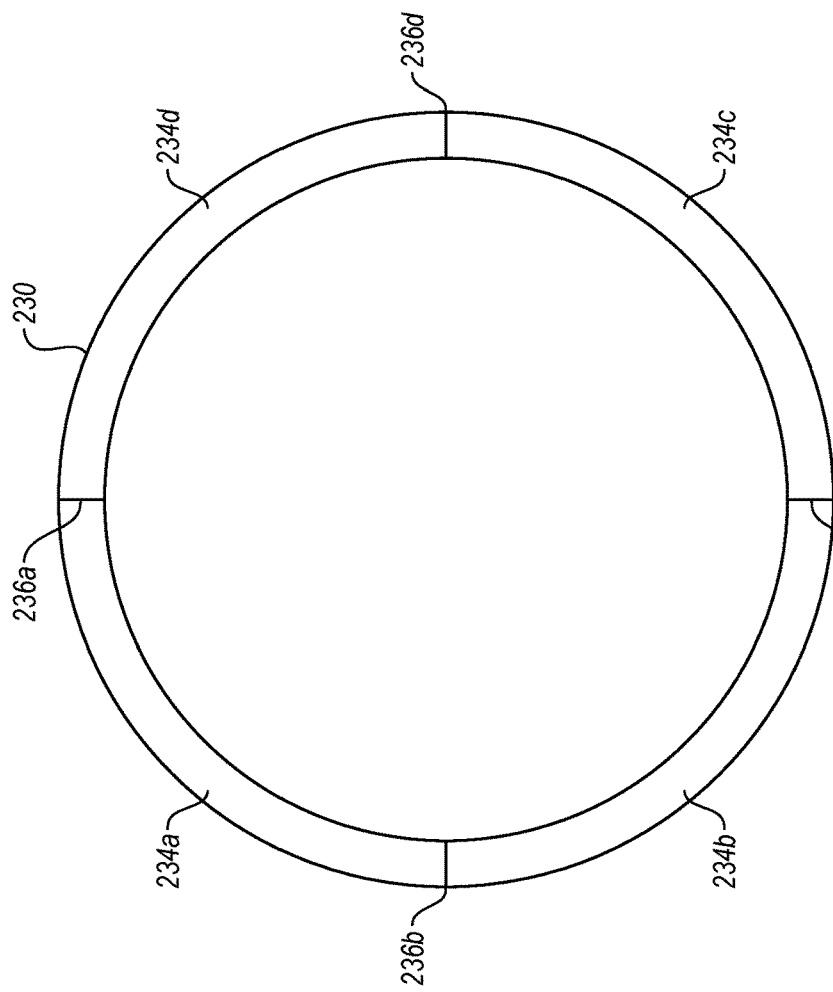
FIG. 2C illustrates an example centerless flywheel.

FIGS. 2C and 2D illustrate an example centerless flywheel 230, in accordance with one or more embodiments of the present disclosure. As illustrated in FIGS. 2C and 2D, the centerless flywheel 230 may include one or more centerless flywheel portions 234a-236d and one or more centerless flywheel pins 236a-236d. The centerless flywheel 230 may be include a device or component that may be used to store rotational energy.

The centerless flywheel 230 may include any shape or profile. The centerless flywheel 230 may have a comparable size and orientation as the centerless rim 210 of FIGS. 2A and/or 2B. In some embodiments, the centerless flywheel 230 may enclose a generally cylindrical shape with two flat faces and one curved face. The centerless flywheel 230 may be configured to rotate about a line that passes approximately perpendicularly the center of the two flat faces of the cylindrical shape enclosed by the centerless flywheel 230. The line about which the centerless flywheel 230 rotates may be the same or similar to the line about which the centerless rim 210 of FIGS. 2A and 2B rotates.

In some embodiments, the structure of the centerless flywheel 230 may be such that matter may be placed within the centerless flywheel 230 in order to increase the weight or mass of the centerless flywheel 230. In some embodiments, the increased weight or mass of the centerless flywheel 230 may allow the centerless flywheel 230 to store additional momentum or rotational energy. Additionally or alternatively, the structure of the centerless flywheel 230 may be such that matter may be removed from the centerless flywheel 230 in order to decrease the weight or mass of the centerless flywheel 230. In some embodiments, the decreased weight or mass of the centerless flywheel 230 may allow the centerless flywheel 230 to be more easily transported.

As shown in FIGS. 2C and 2D, the one or more centerless flywheel portions 234a-234d may include approximately one-quarter of the centerless flywheel 230. The one or more centerless flywheel portions 234a-234d may be coupled together with centerless flywheel pins 236a-236d to form the centerless flywheel 230. Additionally or alternatively, the one or more centerless flywheel portions 234a-234d may be uncoupled such that the centerless flywheel 230 may be more easily transported. In some embodiments, the centerless flywheel portions 234a-234d may be constructed of rubber or any material that may hold sand, water, or other matter. In some embodiments the centerless flywheel 230 may be a bicycle tire or tire from another vehicle.

Modifications, additions, or omissions may be made to FIGS. 2A, 2B, 2C and/or 2D without departing from the scope of the present disclosure. For example, the centerless flywheel assembly 200 may include more or fewer elements than those illustrated and described in the present disclosure. For example, the centerless flywheel assembly 200 may include any of the components or arrangements consistent with the present disclosure.

Figure 3:
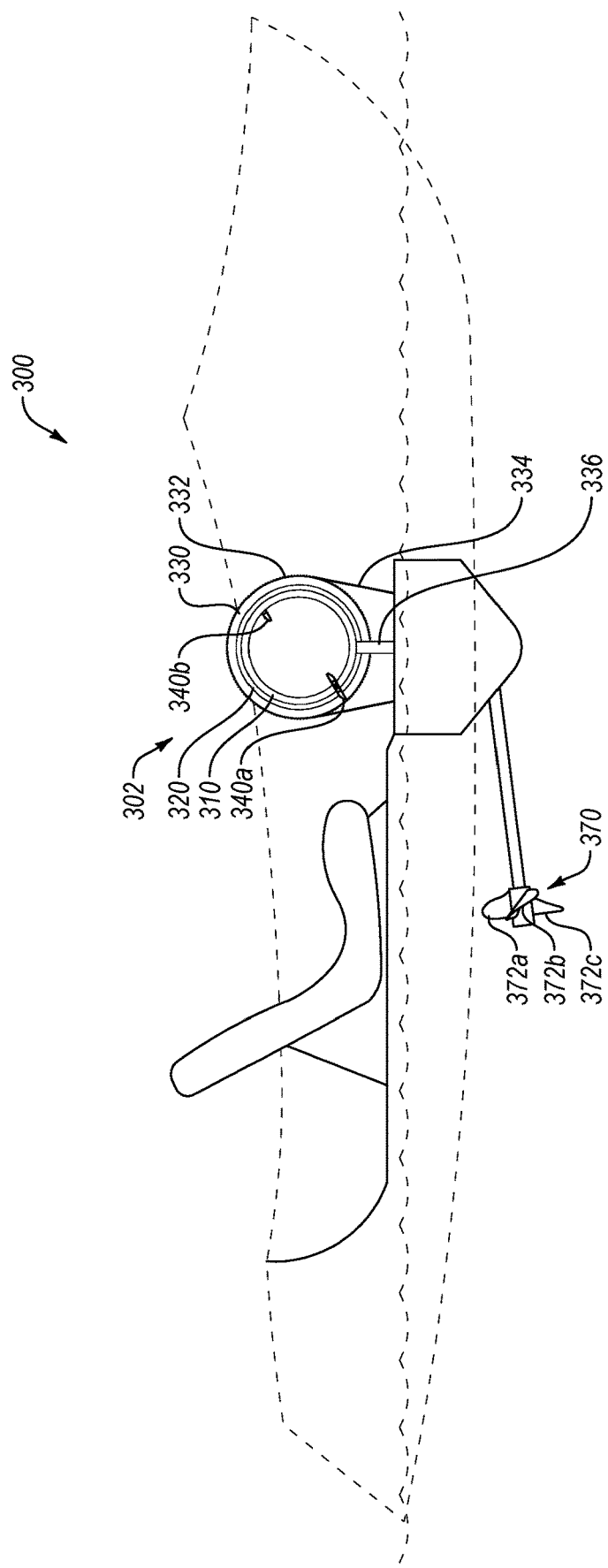
FIG. 3 illustrates an example vehicle with an example centerless flywheel assembly.

FIG. 3 illustrates an example vehicle 300, in accordance with one or more embodiments of the present disclosure. As illustrated in FIG. 3, the vehicle 300 may include a centerless rim assembly 302 coupled with a propeller 370 by a drive chain 334 and a connector 336. The vehicle 300 may be used to generate and/or store momentum or rotational energy in a centerless flywheel 330 generated by user input through a pair of pedals 340a and 340b and use the stored momentum or rotational energy to drive the vehicle 300 via the propeller 370. In some embodiments, the vehicle 300 may be used to provide a more continuous energy source in the absence of constant user input through a pair of pedals 340a and 340b.

One or more of the components of the vehicle 300 may be similar or comparable to the commonly named components of FIGS. 1A and/or 1B. For example, the centerless rim assembly 302 may be similar or comparable to the centerless flywheel assembly 100. More specifically, a centerless rim 310, set of one-way bearings 320, centerless flywheel 330, and pair of pedals 340a and 340b of FIG. 3 may be similar or comparable to the centerless rim 110, set of one-way bearings 120, centerless flywheel 130, and pair of pedals 140a and 140b of FIGS. 1A and/or 1B, respectively.

The centerless rim assembly 302 may be used to store momentum or rotational energy in a centerless flywheel 330. The centerless rim assembly 302 may include a centerless rim 310, a set of one-way bearings 220, a centerless flywheel 330, and a pair of pedals 340a and 340b. In some embodiments, the centerless rim assembly 302 may be coupled with a connector 336. Additionally or alternatively, the centerless rim assembly 302 may be coupled with the vehicle 300.

The connector 336 may include a device or component which may couple the vehicle 300, the centerless rim assembly 302, and the propeller 370. The cross-section of the connector 336 may have any shape. In some embodiments, the connector 336 may couple the centerless rim assembly 302 and the propeller 370 such that as the centerless rim assembly 302 rotates about a vertical axis of the connector 336, the propeller 370 rotates in a corresponding manner. In some embodiments, the connector 336 may couple the centerless rim assembly 302 and the propeller 370 with the vehicle 300.

The centerless flywheel 330 may include a device or component that may be used to store rotational energy transferred through the centerless flywheel 330 from the centerless rim 310. In some embodiments, the centerless flywheel 330 may include the gear teeth 332 located on the outer surface of the centerless flywheel 330 for interfacing with a drive chain 334. In some embodiments, the centerless flywheel 330 may be coupled with the drive chain 334 via the gear teeth 332 such that when the centerless flywheel 330 rotates in a first direction, the drive chain 334 also rotates in the first direction. In some embodiments, the centerless flywheel 330 may be coupled with the propeller 370 via the drive chain 334 such that as the centerless flywheel 330 rotates in the first direction, the propeller 370 is caused to rotate in the first direction.

The centerless flywheel 330 may include any shape or profile. The diameter of the centerless flywheel 330 may be any size or shape. For example, the centerless flywheel 330 may fall within the range of 6 inches to 4 feet. For example, the centerless flywheel 330 may be sized of a circumference and/or width comparable or similar to any standardized size of wheel used on automobiles, motorcycles, scooters, bicycles, earth-moving equipment, wheelchairs and mobility devices, lawn and garden machines, planetary rovers, and/or any other vehicle. In some embodiments, the centerless flywheel 330 may enclose a generally cylindrical shape with two flat faces and one curved face. The centerless flywheel 330 may be configured to rotate about a line that passes approximately perpendicularly the center of the two flat faces of the cylindrical shape enclosed by the centerless flywheel 330. In some embodiments, the centerless flywheel 330 may be indirectly coupled with the centerless rim 310 such that as the centerless rim 310 rotates in a first direction, the centerless flywheel 330 is caused to rotate in the first direction, and as the centerless rim 310 rotates in the second direction, the centerless flywheel 330 is not caused to rotate.

The propeller 370 may include a device or component via which a rotational force transferred from the centerless rim assembly 302 may be applied to drive the vehicle 300. The propeller 370 may be coupled with the centerless rim assembly 302 by a drive chain 334 such that as the centerless flywheel 330 is rotated in a first direction, the drive chain 334 experiences a corresponding rotation in the first direction, which may cause the propeller 370 to rotate in the first direction. In some embodiments, the rotation of the propeller 370 may propel the vehicle 300.

The propeller 370 may be positioned along a plane that is generally perpendicular with the flat faces of the centerless flywheel 330. Additionally or alternatively, the propeller 370 may be positioned along a plane that is generally parallel with the flat faces of the cylindrical shape enclosed by the centerless flywheel 330. In some embodiments, the connector 336 may couple the centerless rim assembly 302 with the propeller 370. In some embodiments, the propeller 370 may include the gear teeth (not pictured) located on a face of the propeller 370 for interfacing with a drive chain 334.

The propeller 370 may include any shape or profile. The propeller 370 may have a comparable size and orientation as the centerless flywheel 330. In some embodiments, the propeller 370 may enclose a generally cylindrical shape with two flat faces and one curved face. The propeller 370 may be configured to rotate about a line that passes approximately perpendicularly through the center of the two flat faces of the cylindrical shape enclosed by the propeller 370.

The propeller 370 may include one or more propeller blades (such as propeller blade 372a, propeller blade 372b, and propeller blade 372c). In some embodiments, the one or more propeller blades 372a-372c may have a pitch such that when the propeller 370 is caused to rotate via the centerless rim assembly 302, the vehicle 300 is driven forward. Additionally or alternatively, the one or more propeller blades 372a-372c may have a pitch such that when fluid flows through the propeller 370, the propeller 370 is caused to rotate.

In some embodiments, a user of the vehicle 300 may obtain directional control of the vehicle 300. For example, the user may apply force to the pedal 340a and/or 340b in such a way that the centerless rim assembly 302 rotates in a first and/or second direction about a vertical axis of the centerless rim assembly 302. In some embodiments, the rotation of the centerless rim assembly 302 in the first and/or second direction causes a rotation of the propeller 370 about a vertical axis of the propeller 370 in the first and/or second direction. Additionally or alternatively, the rotation of the centerless rim assembly 302 in the first and/or second direction may change the angle at which the centerless rim assembly 302 and/or propeller 370 interacts with water or other fluid and may cause the vehicle 300 to turn in the first or the second direction. In some embodiments, a rudder (not shown) may be added to the connector 336 and may assist with the directional control of the vehicle 300.

The vehicle 300 may include a motive force device (not shown). The motive force device may be configured to propel the vehicle 300. In some embodiments, the centerless flywheel 330 may be configured to impart rotational energy to the motive force device. Additionally or alternatively, the motive force device may use the rotational energy provided by the centerless flywheel 330 to propel the vehicle 300.

Modifications, additions, or omissions may be made to FIG. 3 without departing from the scope of the present disclosure. For example, the vehicle 300 may include more or fewer elements than those illustrated and described in the present disclosure. For example, the vehicle 300 may include any of the components or arrangements consistent with the present disclosure.

Figure 4:
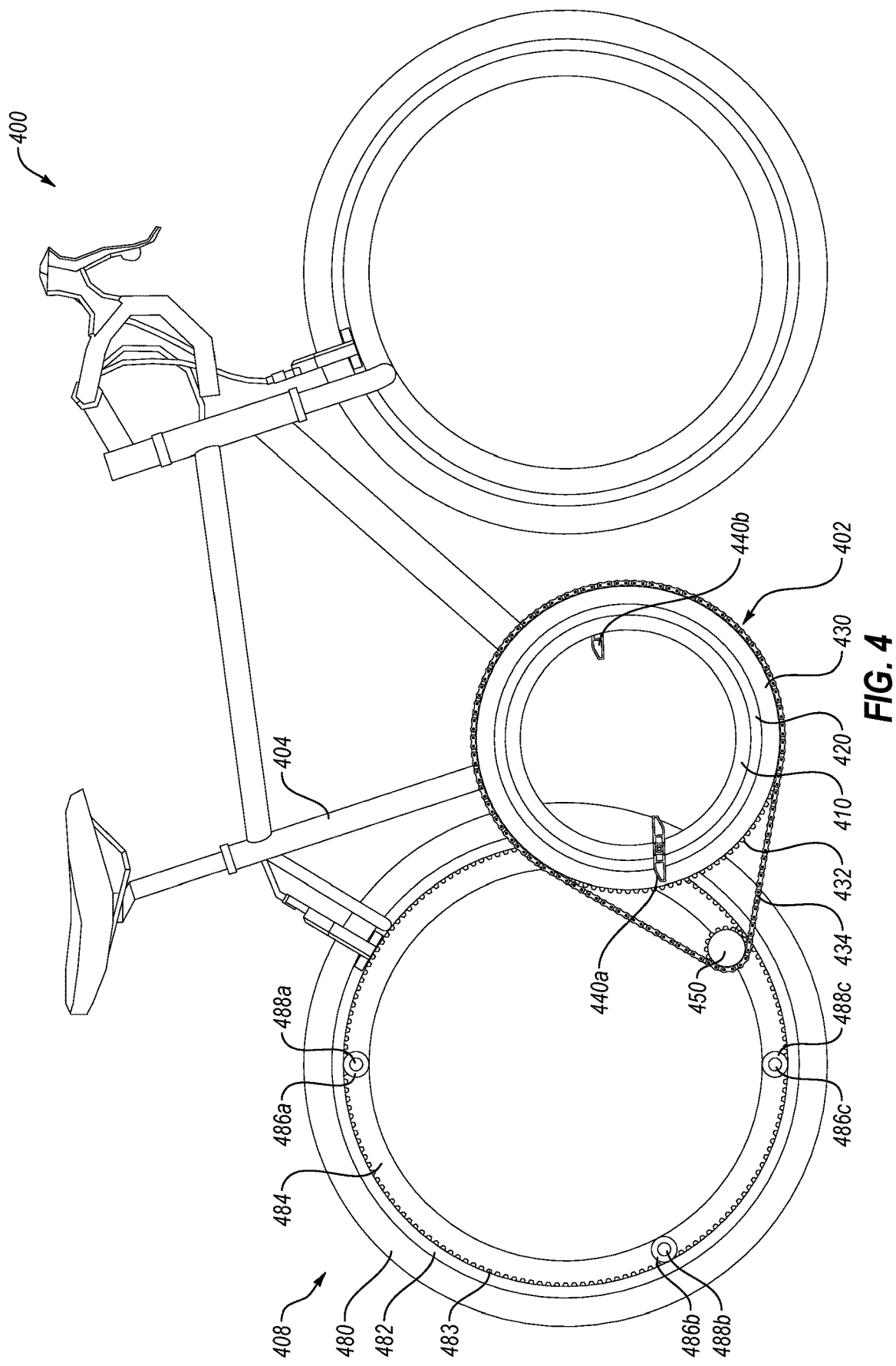
FIG. 4 illustrates another example vehicle with an example centerless flywheel assembly.

FIG. 4 illustrates an example bicycle 400, in accordance with one or more embodiments of the present disclosure. For example, FIG. 4 may illustrate a centerless wheel assembly 408 coupled with a centerless flywheel assembly 402 via a drive chain 434. The bicycle 400 may be used to generate and/or store momentum or rotational energy in a centerless flywheel 430 generated by user input through a pair of pedals 440a and 440b and to subsequently use the stored momentum or rotational energy to drive the bicycle 400 via the centerless wheel assembly 408. In some embodiments, the centerless flywheel assembly 402 may be used to provide a more continuous energy source to the bicycle 400 in the absence of constant user input through the pair of pedals 440a and 440b.

One or more of the components of the bicycle 400 may be similar or comparable to the commonly named components of FIGS. 1A and/or 1B. For example, the centerless flywheel assembly 402 may be similar or comparable to the centerless flywheel assembly 100. More specifically, a centerless rim 410, set of one-way bearings 420, centerless flywheel 430, and pair of pedals 440a and 440b of FIG. 4 may be similar or comparable to the centerless rim 110, set of one-way bearings 120, centerless flywheel 130, and pair of pedals 140a and 140b of FIGS. 1A and/or 1B, respectively. In addition, one or more components of the bicycle 400 may be similar or comparable to the commonly named components of U.S. application Ser. No. 15/146,729, filed on May 4, 2016, and of U.S. application Ser. No. 15/336,540, filed on Oct. 27, 2016.

The centerless flywheel assembly 402 may be used to generate and/or store momentum or rotational energy in the centerless flywheel 430. The centerless flywheel assembly 402 may include the centerless rim 410, the set of one-way bearings 420, the centerless flywheel 430, and the pair of pedals 440a and 440b.

In some embodiments, the set of one-way bearings 420 may include bearings that supply compressed air (not shown) or generate a magnetic field (not shown) to reduce or minimize friction between the centerless rim 410, the set of one-way bearings 420, and/or the centerless flywheel 430. For example, in some embodiments, an air compressor (not shown) may be used to supply air to the compressed air bearings between the centerless rim 410, the set of one-way bearings 420, and/or the centerless flywheel 430 to separate the centerless rim 410, the set of one-way bearings 420, and/or the centerless flywheel 430 in order to reduce friction. In some embodiments, the air compressor may provide air between the centerless rim 410, the set of one-way bearings 420, and/or the centerless flywheel 430 when the speed of the centerless rim 410 drops below the speed of the centerless flywheel 430 and/or when the user stops driving the centerless rim 410 via pedals 440a and 400b in order to preserve the momentum and/or rotational speed of the centerless flywheel 430. Additionally or alternatively, the air compressor may cease to provide air between the centerless rim 410, the set of one-way bearings 420, and/or the centerless flywheel 430 when the user desires the centerless flywheel 430 to engaged with the centerless rim 410 via the set of one-way bearings 420 and/or to drive the centerless flywheel 430 via the centerless rim 410 and/or pedals 440a and 440b.

In some embodiments, the supply of compressed air directed to the compressed air bearings which may be located adjacent to the one or more roller guides may also be utilized to clean the surfaces of the centerless rim 410, the set of one-way bearings 420, and/or the centerless flywheel 430 of debris or foreign material that may otherwise interfere with the paths of centerless rim 410, the set of one-way bearings 420, and/or the centerless flywheel 430.

In some embodiments, in the event the air compressor fails or the supply of air to the bearings is negated, the ring gear 482 may be supported by the roller guides to ensure the system remains in operation until the supply of air is restored. Alternatively, magnetic bearings (not shown) may be utilized to create a field to reduce or minimize physical contact between the one or more roller guides and the ring gear 482. If, in some embodiments, the magnetic field collapses, the one or more roller guides may support the ring gear 482 until such time the magnetic field is restored.

The centerless flywheel assembly 402 may be coupled with a drive chain 434. In some embodiments, the drive chain 434 may mechanically couple the centerless flywheel assembly 402 and the centerless wheel assembly 408 such that rotation of the centerless flywheel 430 may cause a corresponding rotation of the centerless wheel assembly 408. In some embodiments, the centerless flywheel assembly 402 may be coupled to the centerless wheel assembly 408 via the frame 404 of the bicycle 400. For example, the frame 404 may be coupled to one or more exoskeleton plates or other non-rotating components of the bicycle 400. In some embodiments, the centerless flywheel 430 may include gear teeth 432 located on the outer surface of the centerless flywheel 430 for interfacing with a drive chain 434. In some embodiments, the centerless flywheel 430 may be coupled with the drive chain 434 via the gear teeth 432 such that when the centerless flywheel 430 rotates in a first direction, the drive chain 434 also rotates in the first direction.

As illustrated in FIG. 4, the bicycle 400 may include a different structure than centerless flywheel assembly 100 of FIGS. 1A and/or 1B. For example, the bicycle 400 may be a mobile structure and/or device which may use the centerless flywheel assembly 402 to generate and/or store rotational energy and use the stored rotational energy to drive the bicycle 400. In contrast, the centerless flywheel assembly 100 of FIGS. 1A and/or 1B may be a stationary structure and/or device which may be used to generate and/or store rotational energy in order to drive a drive shaft and/or power a generator.

The centerless wheel assembly 408 may include one or more of the following: a drive gear 450, a tire 480, a ring gear 482, an exoskeleton plate 484, one or more roller guides (such as a first roller guide 486a, a second roller guide 486b, and a third roller guide 486c), and one or more roller guide shafts (such as a first roller guide shaft 488a, a second roller guide shaft 488b, and a third roller guide shaft 488c). The centerless wheel assembly 408 may be configured to rotate about a line that passes approximately perpendicularly through the center of the two flat faces of the cylindrical shape enclosed by the centerless flywheel 430.

The drive gear 450 may include a device or component that may be coupled with the drive chain 434 and the ring gear 482. In some embodiments, the drive gear 450 may be fixed to the exoskeleton plate 484 in a way such that the drive gear 450 may be configured to rotate about a line that passes approximately perpendicularly through the center of the drive gear 450. In some embodiments, the drive gear 450 may interface with the drive chain 434 and be configured to rotate with the rotation of the drive chain 434. In some embodiments, the drive gear 450 may be configured to interface with and drive the ring gear 482. The drive gear 450 may be positioned along a plane that is generally parallel with the flat faces of the cylindrical shape enclosed by the exoskeleton plate 484.

The drive chain 434 may include a device or component that transfers rotational energy from centerless flywheel assembly 402 to the centerless wheel assembly 408. In some embodiments, rotation of the centerless flywheel 430 may cause rotation of the centerless flywheel assembly 402. For example, the drive chain 434 may couple the centerless flywheel 430 with the drive gear 450 such that as the centerless flywheel 430 rotates in a first direction, the drive gear 450 is caused to rotate in a first direction. In some embodiments, rotation of the drive gear 450 in a first direction may cause the ring gear 482 to rotate in the first direction.

The exoskeleton plate 484 may include a device or component that may be configured to remain fixed relative to the other devices or components of the bicycle 400. In some embodiments, the exoskeleton plate 484 may be coupled with a frame 404 such that the exoskeleton plate 484 may be configured to remain in a fixed position relative to other components of the bicycle 400. For example, the exoskeleton plate 484 may be configured to remain in a fixed position relative to the ring gear 482 as the ring gear 482 rotates. In some embodiments, one or more roller guide shafts (such as the first roller guide shaft 488a, the second roller guide shaft 488b, and the third roller guide shaft 488c) may be coupled to the exoskeleton plate 484.

The exoskeleton plate 484 may include any shape or profile. The diameter of exoskeleton plate 484 may be any size or shape. For example, the exoskeleton plate 484 may fall within the range of 6 inches to 4 feet. For example, the exoskeleton plate 484 may be sized of a circumference and/or width comparable or similar to any standardized size of wheel used on automobiles, motorcycles, scooters, bicycles, earth-moving equipment, wheelchairs and mobility devices, lawn and garden machines, planetary rovers, and/or any other vehicle. In some embodiments, the exoskeleton plate 484 may enclose a generally cylindrical shape with two flat faces and one curved face. The exoskeleton plate 484 may be configured to rotate about a line that passes approximately perpendicularly the center of the two flat faces of the cylindrical shape enclosed by the exoskeleton plate 484. In some embodiments, the space inside of the exoskeleton plate 484 may be used for the storage of a battery and/or other device or component.

One or more roller guide shafts (such as the first roller guide shaft 488a, second roller guide shaft 488b, and third roller guide shaft 488c) may include a device or component that acts as an axis for and allows rotation of one or more roller guides. In some embodiments, one or more roller guide shafts may be cantilevered from the exoskeleton plate 484. The cross-section of the one or more roller guide shafts may have any shape. The one or more roller guide shafts may be positioned along a plane that is generally perpendicular with the flat faces of the cylindrical shape enclosed by the exoskeleton plate 484 and may project outward away from the flat faces of the exoskeleton plate 484 in a direction generally parallel with the line about which the exoskeleton plate 484.

In some embodiments, one or more roller guides (such as the first roller guide 486a, second roller guide 486b, and third roller guide 486c) may be coupled with one or more roller guide shafts (such as the first roller guide shafts 488a, the second roller guide shaft 488b, and third roller guide shaft 488c) extending from the exoskeleton plate 484 and positioned to roll along the ring gear 482. In some embodiments, one or more roller guides may include bearings to facilitate or otherwise make easier or more efficient the rotation of the roller guides about the one or more roller guide shafts. In some embodiments, the bearings may be rotatably disposed within the one or more roller guides.

In some embodiments, the one or more roller guides (such as the first roller guide 486a, second roller guide 486b, and third roller guide 486c) may include bearings (not shown) that supply compressed air or generate a magnetic field to reduce or minimize friction between the roller guides and the ring gear 482. In some embodiments, a remotely positioned air compressor (not shown) may be used to supply air to the compressed air bearings, in embodiments of the present disclosure associated with a land vehicle with pneumatic tires. For example, in some embodiments, the air compressor may be used to supply air to the compressed air bearings between the roller guides and the ring gear 482 to separate the roller guides and the ring gear 482 in order to reduce friction. In some embodiments, the supply of compressed air directed to the compressed air bearings which may be located adjacent to the one or more roller guides may also be utilized to clean the surfaces of the one or more roller guides, ring gear 482, gear teeth 483, and/or exoskeleton plate 484 of debris or foreign material that may otherwise interfere with the paths of one or more roller guides and or the ring gear 482 and drive gear 450. In some embodiments, in the event the air compressor fails or the supply of air to the bearings is negated, the ring gear 482 may be supported by the roller guides to ensure the system remains in operation until the supply of air is restored. Alternatively, magnetic bearings (not shown) may be utilized to create a field to reduce or minimize physical contact between the one or more roller guides and the ring gear 482. If, in some embodiments, the magnetic field collapses, the one or more roller guides may support the ring gear 482 until such time the magnetic field is restored.

The ring gear 482 may include a device or component that may be configured to interface with the drive gear 450, the one or more roller guides, the tire 480, and/or the ground such that as the drive gear 450 is rotated the drive gear causes a corresponding rotation of the ring gear 482 to propel the bicycle 400.

The ring gear 482 may include gear teeth 483. Additionally or alternatively, the ring gear 482 may include sprockets, spurs, etc., or any other suitable element. In some embodiments, the gear teeth 483 may run along the inner diameter of the ring gear 482. The ring gear 482 and/or the gear teeth 483 may be implemented as a helical gear (left or right-handed), a double helical gear, a spur gear, an internal ring gear, a face gear, a planetary gear, etc. In these and other embodiments, the gear teeth 483 of the ring gear 482 may interface with gear teeth 483 of the drive gear 450. The gear teeth 483 and/or the drive gear 450 may be implemented in a similar manner as that described for the gear teeth 483 and/or the ring gear 482. The gear teeth 483 and/or the drive gear 450 may also be implemented in a different manner. For example, the drive gear 450 may be implemented with gear teeth 483 as helical teeth and the ring gear 482 may be implemented as an internal gear with gear teeth 483 implemented as helical teeth.

The ring gear 482 may include a profile such that one or more roller guides (such as the first roller guide 486a, second roller guide 486b, and third roller guide 486c) may roll along the ring gear 482. In some embodiments, one or more roller guides may be configured to contact the ring gear 482. For example, when in physical contact with the ring gear 482, the one or more roller guides may be shaped, disposed, and/or configured to roll along ring gear 482 without slipping based on static friction. In some embodiments, there may be slipping between the one or more roller guides and the ring gear 482.

In other embodiments, one or more roller guides may be configured to leave a space between the one or more roller guides and the ring gear 482. For example, there may be a gap of approximately at least one, two, three, four, five, ten, fifteen, etc. thousandths of an inch. The gap may be reduced or eliminated in response to the bicycle 400 and/or centerless wheel assembly 408 experiencing a drop from an elevation and/or a compression due to a great force or impact such as, for example, an abrupt or sudden stop. The one or more bearings may contact the ring gear 482 in response to the drop and/or the compression, which may mitigate effects of the drop and/or the compression.

The tire 480 may include a device or component that may be configured to interface with ring gear 482 and the ground to provide traction for the bicycle 400 and to allow the bicycle 400 to roll along the ground. In some embodiments, the tire 480 may be fixedly coupled with the ring gear 482 and may rotate in the same direction as the ring gear 482.

Modifications, additions, or omissions may be made to FIG. 4 without departing from the scope of the present disclosure. For example, the bicycle 400 may include more or fewer elements than those illustrated and described in the present disclosure. For example, the bicycle 400 may include any of the components or arrangements consistent with the present disclosure.

FIG. 5 illustrates an example centerless flywheel assembly 500, in accordance with one or more embodiments of the present disclosure. For example, FIG. 5 may illustrate a centerless turbine 570 coupled with a centerless rim 510 and support arms 560a and 560b to support a centerless rim 510, a set of one-way bearings 520, a centerless flywheel 530, gear teeth 532, and/or a drive gear 550. One or more of the components of the centerless flywheel assembly 500 may be similar or comparable to the commonly named components of FIGS. 1A and/or 1B. For example, the centerless rim 510 of FIG. 5 may be similar or comparable to the centerless rim 110 of FIGS. 1A and/or 1B, and the set of one-way bearings 520, centerless flywheel 530, gear teeth 532, and drive gear 550 of FIG. 5 may be similar or comparable to the set of one-way bearings 120, centerless flywheel 130, gear teeth 132, and drive gear 150 of FIGS. 1A and/or 1B, respectively.

As illustrated in FIG. 5, the centerless flywheel assembly 500 may include a different structure than the centerless flywheel assembly 100 of FIGS. 1A and/or 1B. For example, the centerless rim 510 of FIG. 5 may be coupled with a centerless turbine 570.

The centerless flywheel assembly 500 may be used to store momentum or rotational energy in a centerless flywheel 530 and to use the stored momentum or rotational energy to power the centerless flywheel assembly 500. In some embodiments, the centerless flywheel 530 may store rotational energy generated by the movement of the centerless rim 510 via the centerless turbine 570 and transferred through the set of one-way bearings 520 into the centerless flywheel 530. In some embodiments, the centerless rim 510 may be indirectly coupled with the centerless flywheel 530 such that as the centerless rim 510 rotates in a first direction, the centerless flywheel 530 is caused to rotate in the first direction, and as the centerless rim 510 rotates in the second direction, the centerless flywheel 530 is not caused to rotate.

The centerless turbine 570 may include a device or component that may be fixedly coupled with the centerless rim 510 and configured to interact with a flowing fluid in such a way that the flowing fluid running along one or more rotors 572 of the centerless turbine 570 may cause the centerless turbine 570 to rotate. Additionally or alternatively, the centerless turbine 570 may rotate with the rotation of the centerless rim 510. In some embodiments, the centerless turbine 570 may be fixedly coupled to an inside portion of the centerless rim 510.

The centerless turbine 570 may include any shape or profile. The centerless turbine 570 may include a profile such that the centerless turbine 570 may be placed within the centerless rim 510. In addition, the centerless rim 510 may be sized of a circumference and/or width comparable or similar to any standardized size of wind or water turbine. In some embodiments, the centerless turbine 570 may enclose a generally cylindrical shape with two flat faces and one curved face. The centerless turbine 570 may be configured to rotate about a line that passes approximately perpendicularly through the center of the two flat faces of the cylindrical shape enclosed by the centerless turbine 570. In some embodiments, the centerless turbine 570 may include one or more rotors 572.

The one or more rotors 572 may include any shape or profile. For example, the one or more rotors 572 may be shaped as or may be similar to fins, propeller blades, fan blades, turbine blades, and/or any other shape which may allow the centerless turbine 570 to rotate during interaction with a flowing fluid. In some embodiments, the one or more rotors 572 may have a pitch such that when fluid flows through the centerless turbine 570, the centerless turbine 570 may be caused to rotate.

Modifications, additions, or omissions may be made to FIG. 5 without departing from the scope of the present disclosure. For example, the centerless flywheel assembly 500 may include more or fewer elements than those illustrated and described in the present disclosure. For example, the centerless flywheel assembly 500 may include any of the components or arrangements consistent with the present disclosure.

FIGS. 6A-6F illustrate a cross-section view of various example portions of centerless wheel assemblies 600a-600f in accordance with one or more embodiments of the present disclosure. For example, in some embodiments, FIGS. 6A-6F may illustrate various examples of how one or more sets of one-way bearings may be implemented and/or configured between a centerless rim and a centerless flywheel as shown in FIGS. 1A and 1B.

Figure 6A:
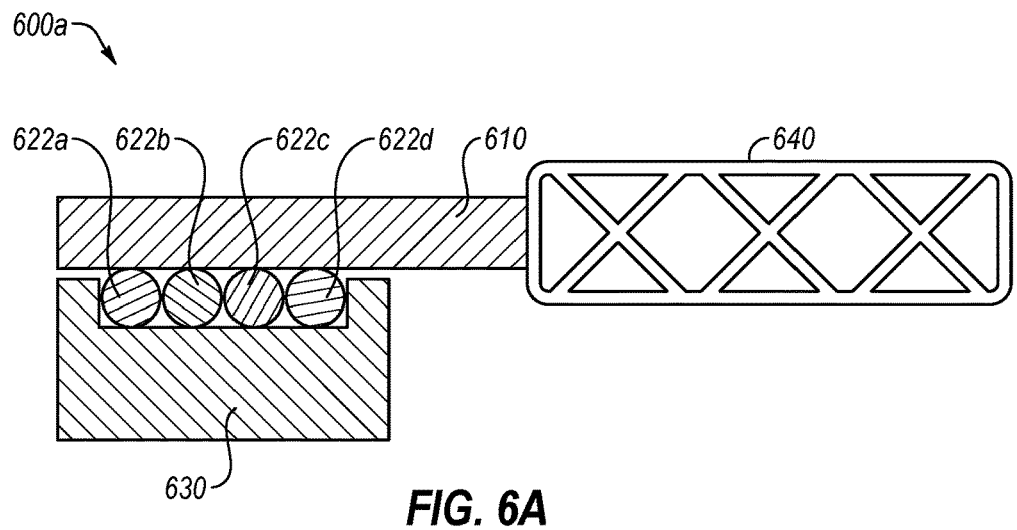
FIGS. 6A-6F illustrate cross-sectional views of various examples of portions of a centerless wheel assembly.
Figure 6B:
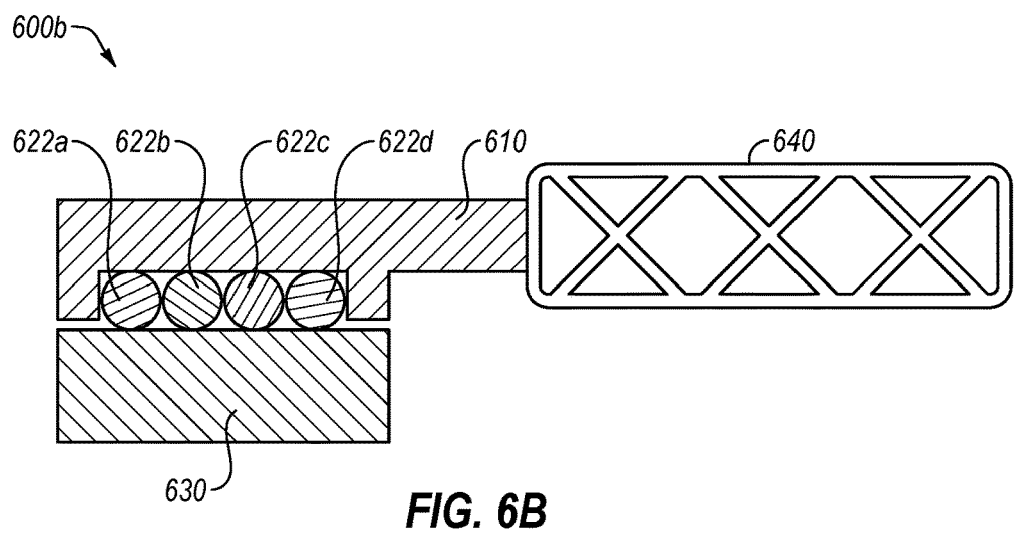

As illustrated in FIG. 6A, in some embodiments, a centerless rim 610 may be shaped to enclose one or more bearings (such as bearings 622a, bearings 622b, bearings 622c, and bearings 622d) between the centerless rim 610 and a centerless flywheel 630 and may facilitate rotation of the centerless flywheel 630 with respect to the centerless rim 610. As illustrated in FIG. 6B, in some embodiments, the centerless flywheel 630 may be shaped to enclose bearings 622a-622d between the centerless flywheel 630 and the centerless rim 610 and may facilitate rotation of the centerless flywheel 630 with respect to the centerless rim 610.

Figure 6C:
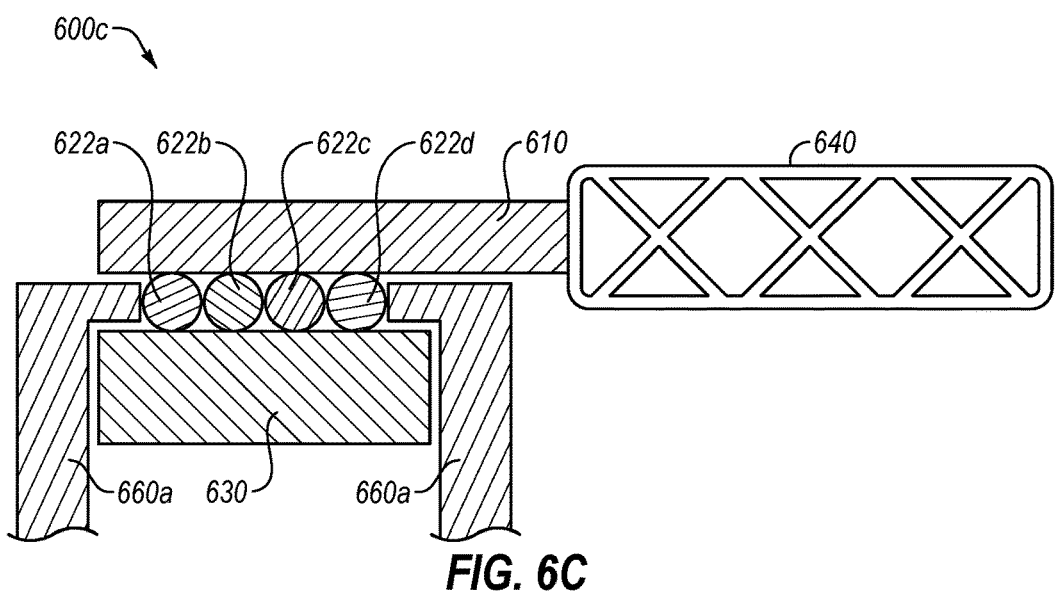
Figure 6D:
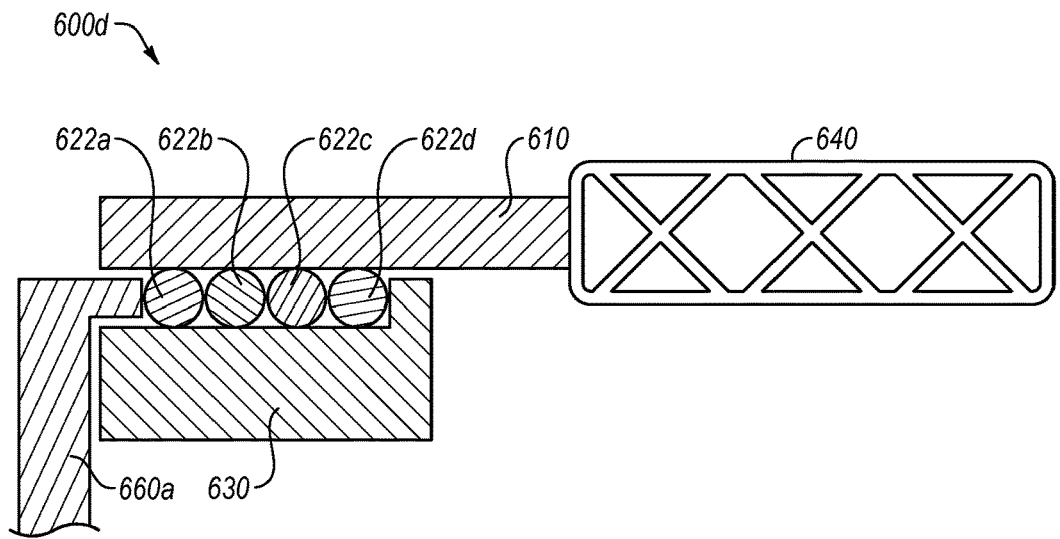

As illustrated in FIGS. 6C-6F, in some embodiments, bearings 622a-622d may be placed between the centerless rim 610 and the centerless flywheel 630. As illustrated in FIG. 6C, in some embodiments, mounting arms 660a and 660b may be used to discourage lateral translation of bearings 622a-622d. As illustrated in FIG. 6D, in some embodiments, one of mounting arms 660a or 660b and the centerless flywheel 630 may be used to discourage lateral translation of bearings 622a-622d.

Figure 6E:
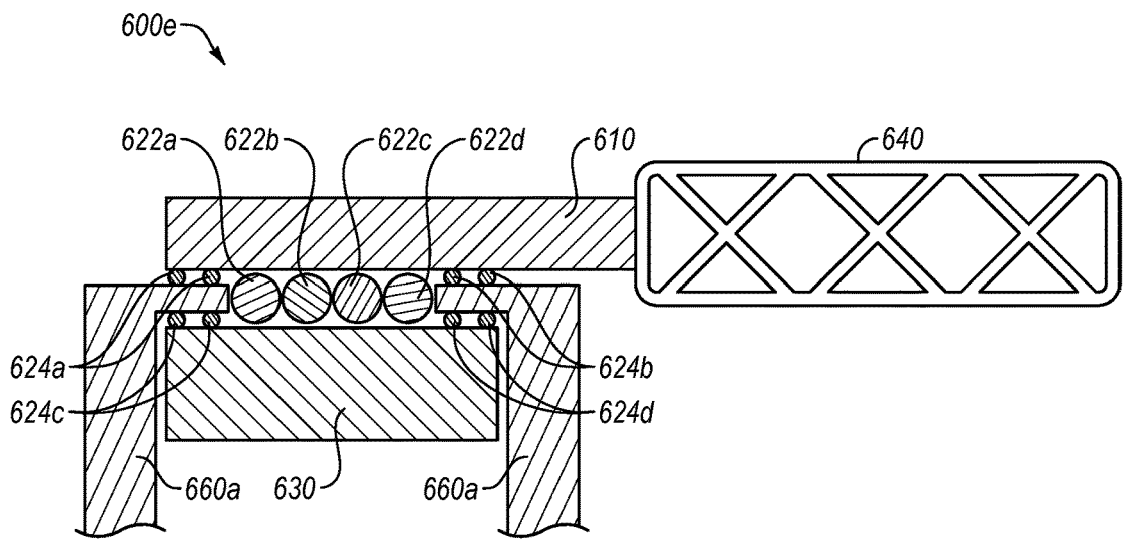

As illustrated in FIG. 6E, in some embodiments, mounting arms 660a and 660b may be used to discourage lateral translation of bearings 622a-622d. In addition, one or more sets of one or more bearings (such as bearing sets 624a-624d) may be placed between the centerless rim 610 and mounting arms 660a and 660b and between the centerless flywheel 630 and mounting arms 660a and 660b.

Figure 6F:
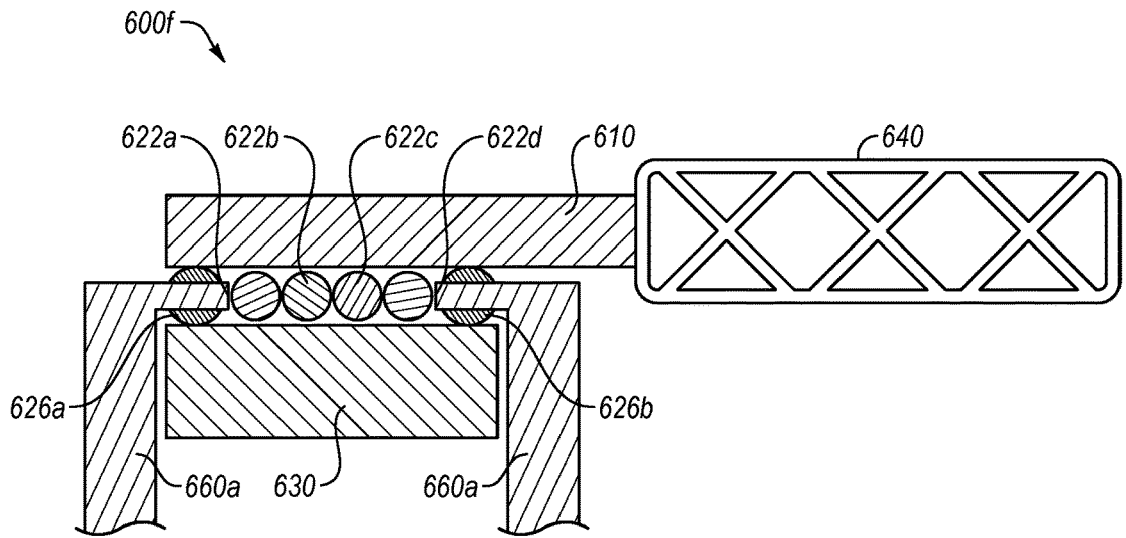

As illustrated in FIG. 6F, in some embodiments, mounting arms 660a and 660b may be used to discourage lateral translation of bearings 622a-622d. In addition, one or more bearings (such as bearings 626a-626b) may be coupled to mounting arms 660a and 660b and between the centerless rim 610 and mounting arms 660a and 660b and between the centerless flywheel 630 and mounting arms 660a and 660b.

Modifications, additions, or omissions may be made to FIGS. 6A, 6B, 6C, 6D, 6E, and/or 6F without departing from the scope of the present disclosure. For example, the centerless flywheel assembly 600 may include more or fewer elements than those illustrated and described in the present disclosure. For example, the centerless flywheel assembly 600 may include any of the components or arrangements consistent with the present disclosure.

FIGS. 7A and 7B illustrate various views of an example centerless flywheel assembly 700, in accordance with one or more embodiments of the present disclosure. One or more of the components of the centerless flywheel assembly 700 may be similar or comparable to the commonly named components of FIGS. 1A and/or 1B. For example, a centerless rim 710 of FIGS. 7A and 7B may be similar or comparable to the centerless rim 110 of FIGS. 1A and/or 1B. In addition, a first set of roller guides (such as a first roller guide 720a, second roller guide 720b, and third roller guide 720c) may be similar or comparable to the one or more roller guides (such as the first roller guide 486a, second roller guide 486b, and third roller guide 486c) of FIG. 4, respectively. In addition, the one-way bearing 720 and centerless flywheel 730 of FIGS. 7A and 7B may be similar or comparable to the one-way bearing 120 and centerless flywheel 130 of FIGS. 1A and/or 1B.

As illustrated in FIGS. 7A and 7B, the centerless flywheel assembly 700 may include a different structure than the centerless flywheel assembly 100 of FIGS. 1A and/or 1B. For example, the centerless flywheel assembly 700 may be used in conjunction with one or more parts of a vehicle (not shown) to generate and/or store rotational energy and/or momentum and use the stored rotational energy and/or momentum to drive the centerless rim 710, the centerless flywheel 730, any other component of the centerless flywheel assembly 700, and/or the vehicle.

In addition, in some embodiments, an input driver shaft 796 may be configured to interface with the centerless rim 710. Additionally or alternatively, the input driver shaft 796 may be configured to interface with the centerless flywheel 730. In some embodiments, the input driver shaft 796 may connect to a motor, pump, generator, propeller, turbine, or similar element (not pictured) which may drive the input driver shaft 796 and cause the input driver shaft 796 to rotate. In some embodiments, the rotation of the input driver shaft 796 may cause the centerless rim 710 to rotate in a first direction. Additionally or alternatively, the rotation of the input driver shaft 796 may cause the centerless flywheel 730 to rotate in a second direction. In some embodiments, the rotation of the centerless flywheel 730 may cause a continuously variable transmission 790 to rotate in the first direction via a second set of roller guides 720a-720c.

In contrast, the centerless flywheel assembly 100 of FIGS. 1A and/or 1B may use the centerless flywheel assembly 402 to generate and/or store rotational energy and use the stored rotational energy to drive the bicycle 400. In addition, the centerless rim 710, the first set of roller guides (such as the first roller guide 720a, second roller guide 720b, third roller guide 720c), and centerless flywheel 730 may be configured to interface and function differently than the centerless rim 110 and centerless flywheel 130 of FIGS. 1A and/or 1B and the one or more roller guides (such as the first roller guide 486a, second roller guide 486b, and third roller guide 486c) of FIG. 4.

The centerless flywheel assembly 700 may include a centerless rim 710, a first set of roller guides (such as the first roller guide 720a, second roller guide 720b, and third roller guide 720c), a first set of roller guide shafts (such as a first roller guide shaft 722a, second roller guide shaft 722b, and third roller guide shaft 722c), a second set of roller guides (such as a fourth roller guide 724a, a fifth roller guide 724b, a sixth roller guide 724c), a second set of roller guide shafts (such as a fourth roller guide shaft 726a, a fifth roller guide shaft 726b, a sixth roller guide shaft 726c), a centerless flywheel 730, a continuously variable transmission 790, a first roller 792a and second roller 792b, a continuously variable transmission belt 794, an output driver shaft 798, an input driver shaft 796. In some embodiments, the centerless flywheel assembly 700 may also include one or more one-way bearings (not shown) in addition to the first set of roller guides and/or the second set of roller guides. Additionally or alternatively, the centerless flywheel assembly 700 may include one or more one-way bearings in combination with the first set of roller guides and/or the second set of roller guides. Additionally or alternatively, the centerless flywheel assembly 700 may substitute one or more one-way bearings for the first set of roller guides and/or the second set of roller guides.

The centerless rim 710 may include any shape or profile. The centerless rim 710 may include a profile such that the first set of roller guides (such as the first roller guide 720a, second roller guide 720b, and third roller guide 720c) may roll along an inner portion of the centerless rim 710. The centerless rim 710 may be sized of a circumference and/or width comparable or similar to any standardized size of wheel used on automobiles, motorcycles, scooters, bicycles, earth-moving equipment, wheelchairs and mobility devices, lawn and garden machines, planetary rovers, and/or any other vehicle in general. In some embodiments, the centerless rim 710 may enclose a generally cylindrical shape with two flat faces and one curved face.

The centerless rim 710 may be configured to rotate about a line that passes approximately perpendicularly the center of the two flat faces of the cylindrical shape enclosed by the centerless rim 710. In some embodiments, the centerless rim 710 may include gear teeth 712 located on the inner surface of the centerless rim 710 for interfacing with the second roller 792b. In some embodiments, the centerless rim 710 may act as a rim for a tire. In some embodiments, the centerless rim 710 may be replaced with a tire.

The first set of roller guides (such as the first roller guide 720a, second roller guide 720b, and third roller guide 720c) may be disposed between the centerless rim 710 and the centerless flywheel 730 and may include a profile such that the centerless flywheel 730 may roll along the first set of roller guides. For example, the first set of roller guides or other ratchet-like mechanism may facilitate rotation of the centerless flywheel 730 relative to the centerless rim 710. Additionally or alternatively, the first set of roller guides may facilitate driving the centerless flywheel 730 in a first direction of rotation while allowing the centerless rim 710 to rotate in the first direction, rotate in a second direction, or remain stationary. In some embodiments, the centerless rim 710 may be indirectly coupled with the centerless flywheel 730.

The centerless flywheel 730 may include any shape or profile. The centerless flywheel 730 may have a comparable size and orientation as the centerless rim 710. In some embodiments, the centerless flywheel 730 may enclose a generally cylindrical shape with two flat faces and one curved face. The centerless flywheel 730 may be configured to rotate about a line that passes approximately perpendicularly through the center of the two flat faces of the cylindrical shape enclosed by the centerless flywheel 730. In some embodiments, the centerless flywheel 730 may include gear teeth (not shown) located on the outer surface of the centerless flywheel 730 for interfacing with the second roller 792b.

In some embodiments, the centerless flywheel 730 may store rotational energy. For example, the centerless flywheel 730 may store rotational energy generated by the rotation of the centerless rim 710 and transferred through the first roller guide 720a, second roller guide 720b, and third roller guide 720c into the centerless flywheel 730. In some embodiments, the centerless flywheel 730 may rotate more quickly than the centerless rim 710. In some embodiments, the centerless rim 710 and the centerless flywheel 730 may be coupled with the second roller 792b in such a way that the centerless rim 710 rotates in a first direction while the centerless flywheel 730 rotates in a second and opposite direction. In some embodiments, the centerless flywheel 730 may continue to rotate when the centerless rim 710 is no longer rotating. In some embodiments, the centerless flywheel 730 may store rotational energy generated by the rotation of the second roller 792b.

In some embodiments, the centerless flywheel assembly 700 may be installed on a vehicle. In some embodiments, when a braking force is applied to the centerless rim 710 or to a tire coupled with the centerless rim 710, the centerless flywheel 730 may be caused to rotate at a high velocity and may remain rotating after the centerless rim 710 and/or tire is stationary. In some embodiments, the rotation or momentum of the centerless flywheel 730 may be used to drive the centerless flywheel assembly 700. In some embodiments, when the braking force is removed from the centerless rim 710 or to the tire coupled with the centerless rim 710 and/or when an accelerating force is applied to the centerless rim 710 or to the tire coupled with the centerless rim 710, the rotation and/or momentum of the centerless flywheel 730 may be transferred to an output driver shaft 798 via the continuously variable transmission 790. In some embodiments, the continuously variable transmission 790 may be configured to indirectly couple with the centerless rim 710. Additionally or alternatively, the output driver shaft 798 may drive the centerless flywheel assembly 700 and/or vehicle.

The second set of roller guides (such as the fourth roller guide 724a, fifth roller guide 724b, and sixth roller guide 724c) may be disposed between the centerless flywheel 730 and continuously variable transmission 790 and may include a profile such that the continuously variable transmission 790 may roll along the second set of roller guides.

The continuously variable transmission 790 may be coupled with the output driver shaft 798. Additionally or alternatively, the output driver shaft 798 may be coupled to the first roller 792a. In some embodiments, the first roller 792a may be coupled to the second roller 792b via the continuously variable transmission belt 794. In some embodiments, the continuously variable transmission belt 794 may cause the first roller 792a and the second roller 792b to rotate in the same direction. In some embodiments, the second roller 792b may be coupled to the input driver shaft 796.

Modifications, additions, or omissions may be made to FIGS. 7A and/or 7B without departing from the scope of the present disclosure. For example, the centerless flywheel assembly 700 may include more or fewer elements than those illustrated and described in the present disclosure. For example, the centerless flywheel assembly 700 may include any of the components or arrangements consistent with the present disclosure.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A centerless wheel assembly comprising:
    a centerless rim configured to rotate about a point;
    a centerless flywheel configured to indirectly couple with the centerless rim and to rotate about the point;
    a device configured to interface with the centerless rim and to rotate the centerless rim in a first direction and in a second direction; and
    a one-way bearing disposed between the centerless rim and the centerless flywheel, the one-way bearing positioned such that as the centerless rim rotates in the first direction, the centerless flywheel is caused to rotate, and as the centerless rim rotates in the second direction, the centerless flywheel is not caused to rotate.

2. The centerless wheel assembly of claim 1, further comprising a drive gear shaped to interface with the centerless flywheel, the drive gear configured to rotate as the centerless flywheel rotates, the centerless flywheel configured to drive the drive gear.

3. The centerless wheel assembly of claim 2, further comprising a shaft with a first end and a second end, the shaft coupled to the drive gear on the first end and coupled to a generator on the second end.

4. The centerless wheel assembly of claim 3, further comprising a clutch coupled to the drive gear such that when the clutch is engaged, the shaft is caused to rotate.

5. The centerless wheel assembly of claim 1, further comprising a pair of pedals coupled to the centerless rim, wherein operating the pair of pedals causes the centerless rim to rotate.

6. The centerless wheel assembly of claim 1, further comprising a drive chain coupled to centerless flywheel such that as the centerless flywheel rotates, the drive chain is caused to rotate.

7. The centerless wheel assembly of claim 1, further comprising a turbine disposed within the centerless rim and fixedly coupled to the centerless rim such that as the turbine is caused to rotate, the centerless rim is caused to rotate.

8. The centerless wheel assembly of claim 1, wherein the one-way bearing enables the centerless flywheel to continue to rotate in the first direction when the centerless rim is rotating in the second direction or is not caused to rotate.

9. The centerless wheel assembly of claim 1, further comprising:
a continuously variable transmission configured to indirectly couple with the centerless flywheel; and
a first plurality of roller guides disposed between the centerless flywheel and the continuously variable transmission, the first plurality of roller guides positioned such that as the centerless flywheel rotates, the continuously variable transmission is also caused to rotate.

10. The centerless wheel assembly of claim 9, further comprising:
an input driver shaft, the input driver shaft disposed between the centerless rim and a first roller;
the first roller, the first roller configured to rotate about a second point;
an output driver shaft, the output driver shaft disposed between the continuously variable transmission and a second roller;
the second roller configured to rotate about the point; and
a continuously variable transmission belt, the continuously variable transmission belt coupling the first roller and the second roller such that as the first roller rotates in the first direction, the second roller is caused to rotate in the first direction.

11. A centerless wheel assembly comprising:
a centerless rim configured to rotate about a point;
a centerless flywheel configured to indirectly couple with the centerless rim and to rotate about the point;
a device configured to interface with the centerless rim and to rotate the centerless rim in a first direction and in a second direction; and
a first plurality of roller guides disposed between the centerless rim and the centerless flywheel, the first plurality of roller guides positioned such that as the centerless rim rotates in the first direction, the centerless flywheel is caused to rotate and as the centerless rim rotates in the second direction, the centerless flywheel is not caused to rotate.

12. The centerless wheel assembly of claim 11, further comprising a drive gear shaped to interface with the centerless flywheel, the drive gear configured to rotate as the centerless flywheel rotates, the centerless flywheel configured to drive the drive gear.

13. The centerless wheel assembly of claim 12, further comprising a shaft with a first end and a second end, the shaft coupled to the drive gear on the first end and coupled to a generator on the second end.

14. The centerless wheel assembly of claim 13, further comprising a clutch coupled to the drive gear such that when the clutch is engaged, the drive gear is caused to rotate.

15. The centerless wheel assembly of claim 11, further comprising a drive chain coupled to the centerless flywheel such that as the centerless flywheel rotates, the drive chain is caused to rotate.

16. The centerless wheel assembly of claim 11, further comprising a turbine disposed within the centerless rim and fixedly coupled to the centerless rim such that as the turbine is caused to rotate, the centerless rim is caused to rotate.

17. The centerless wheel assembly of claim 11, wherein the first plurality of roller guides enables the centerless flywheel to rotate in the first direction when the centerless rim is rotating in the second direction or is not caused to rotate.

18. The centerless wheel assembly of claim 11, further comprising:
a continuously variable transmission configured to indirectly couple with the centerless flywheel; and
a second plurality of roller guides disposed between the centerless flywheel and the continuously variable transmission, the second plurality of roller guides positioned such that as the centerless flywheel rotates, the continuously variable transmission is also caused to rotate.

19. The centerless wheel assembly of claim 18, further comprising:
an input driver shaft, the input driver shaft disposed between the centerless rim and a first roller;
the first roller, the first roller configured to rotate about a second point;
an output driver shaft, the output driver shaft disposed between the continuously variable transmission and a second roller;
the second roller, the second roller configured to rotate about the point; and
a continuously variable transmission belt, the continuously variable transmission belt coupling the first roller and the second roller such that as the first roller rotates in the first direction, the second roller is caused to rotate in the first direction.

20. A vehicle comprising:
a centerless wheel assembly, comprising:
a centerless rim configured to rotate about a point;
a centerless flywheel configured to indirectly couple with the centerless rim and to rotate about the point;
a device for rotating the centerless rim in a first direction and in a second direction; and
a first plurality of roller guides disposed between the centerless rim and the centerless flywheel, the first plurality of roller guides positioned such that as the centerless rim rotates in the first direction, the centerless flywheel is caused to rotate in the second direction and as the centerless rim rotates in the second direction, the centerless flywheel is not caused to rotate; and a motive force device configured to propel the vehicle, the centerless flywheel configured to impart rotational energy to the motive force device to propel the vehicle.

\* \* \* \* \*